US 8,052,329 B2

(12) United States Patent
Ono et al.

(10) Patent No.: US 8,052,329 B2
(45) Date of Patent: Nov. 8, 2011

(54) WHEEL BEARING APPARATUS INCORPORATED WITH A WHEEL SPEED DETECTING APPARATUS

(75) Inventors: Yujiro Ono, Iwata (JP); Kazunari Yamamoto, Iwata (JP); Yasushi Shibata, Iwata (JP); Keizo Kobayashi, Iwata (JP); Hiroshi Kawamura, Iwata (JP); Akira Torii, Iwata (JP)

(73) Assignee: NTN Corporation (JP)

( * ) Notice: Subject to any disclaimer, the term of this patent is extended or adjusted under 35 U.S.C. 154(b) by 0 days.

(21) Appl. No.: 12/640,375

(22) Filed: Dec. 17, 2009

(65) Prior Publication Data
US 2010/0092117 A1 Apr. 15, 2010

Related U.S. Application Data

(63) Continuation of application No. PCT/JP2008/001551, filed on Jun. 17, 2008.

(30) Foreign Application Priority Data

Jun. 19, 2007 (JP) ................................ 2007-161478
Jun. 29, 2007 (JP) ................................ 2007-172075
Jul. 6, 2007 (JP) ................................ 2007-178200
Jul. 9, 2007 (JP) ................................ 2007-179278
Aug. 3, 2007 (JP) ................................ 2007-202534
Aug. 24, 2007 (JP) ................................ 2007-217799

(51) Int. Cl.
*F16C 32/00* (2006.01)
(52) U.S. Cl. ........................................................ 384/448
(58) Field of Classification Search ................ 384/448, 384/544, 589; 324/173, 174, 207.25
See application file for complete search history.

(56) References Cited

U.S. PATENT DOCUMENTS

| 5,852,361 | A  | * | 12/1998 | Ouchi et al. ................... 324/174 |
| 7,318,589 | B2 | * | 1/2008 | Kageyama et al. ........... 384/448 |
| 7,614,795 | B2 | * | 11/2009 | Adachi et al. ................. 384/484 |
| 2004/0120620 | A1 | * | 6/2004 | Landrieve ....................... 384/448 |
| 2004/0228556 | A1 | * | 11/2004 | Ohtsuki et al. ................. 384/448 |
| 2004/0258337 | A1 | * | 12/2004 | Norimatsu et al. ............. 384/448 |

FOREIGN PATENT DOCUMENTS

| JP | 2003057070 A | * | 2/2003 |
| JP | 2003-254985 |   | 9/2003 |
| JP | 2004-076753 |   | 3/2004 |
| JP | 2005-233857 |   | 9/2005 |
| JP | 2006112919 A | * | 4/2006 |
| JP | 2007-010480 |   | 1/2007 |
| JP | 2007-051763 |   | 3/2007 |

* cited by examiner

*Primary Examiner* — Thomas R Hannon
(74) *Attorney, Agent, or Firm* — Harness, Dickey & Pierce, P.L.C.

(57) ABSTRACT

A wheel bearing apparatus incorporating a wheel speed detecting apparatus has an outer member, an inner member, double row rolling elements, a sensor holder, and a pulser ring. The sensor holder cover has a cylindrical fitting portion press-fit onto the inner side end portion of the outer member. A flange portion extends radially inward from the fitting portion. The flange portion is in close contact with the end face of the outer member. A bottom portion extends further radially inward from the flange portion. The holding portion is integrally joined to the bottom portion. The flange portion is formed with a flat surface so that it forms an abutting width larger than 5 mm or more, against the end face of the outer member, or larger than 50% or more, relative to the flat width of the end face of the outer member.

16 Claims, 23 Drawing Sheets

[Fig 1]
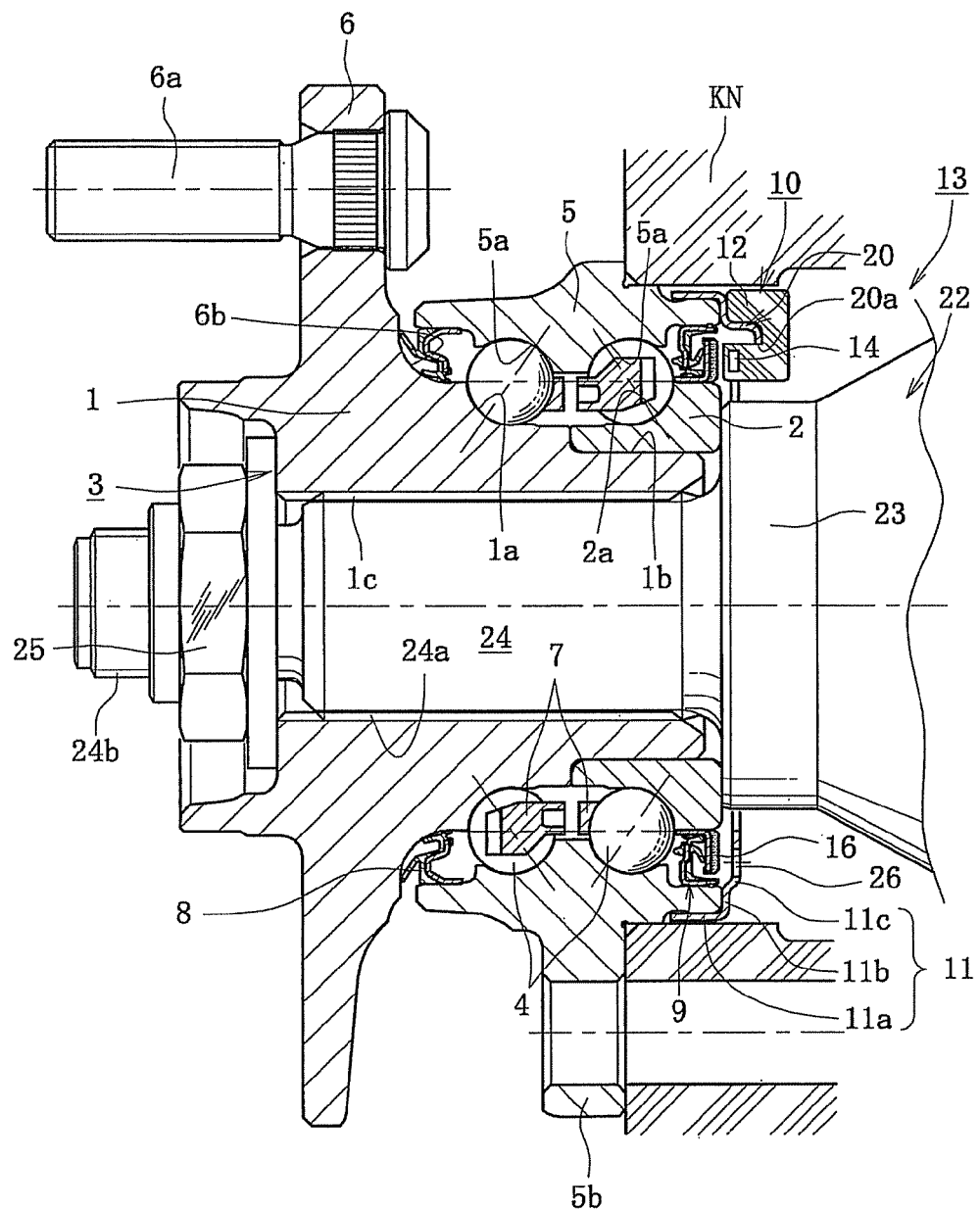

[ Fig 2 ]
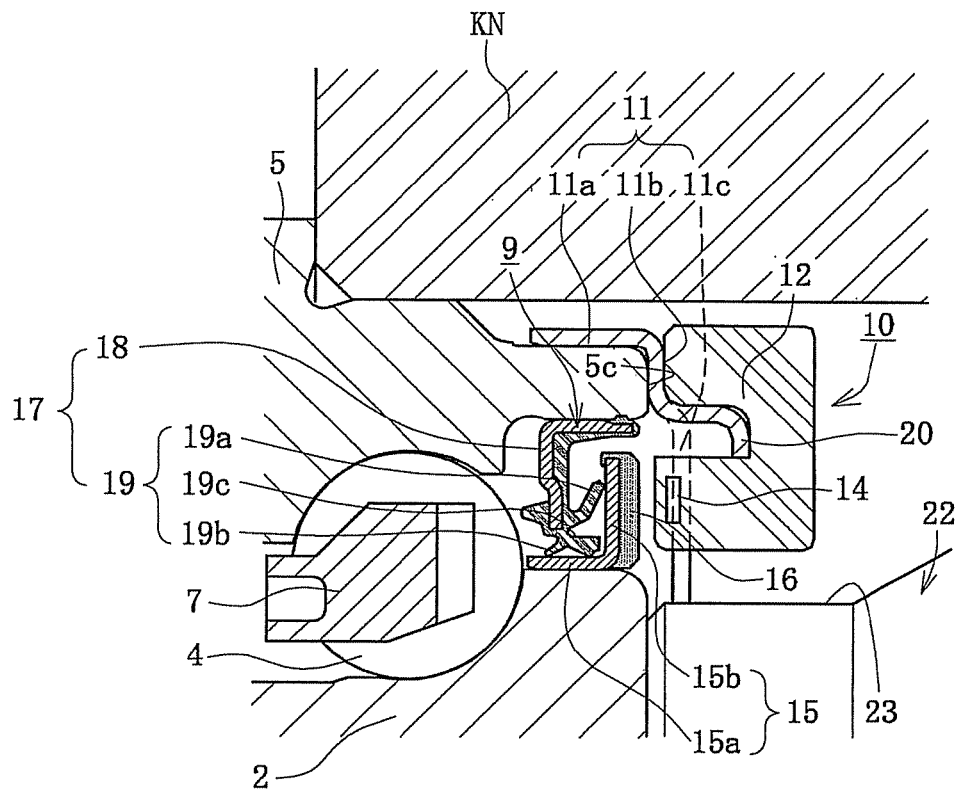
[ Fig 3 ]
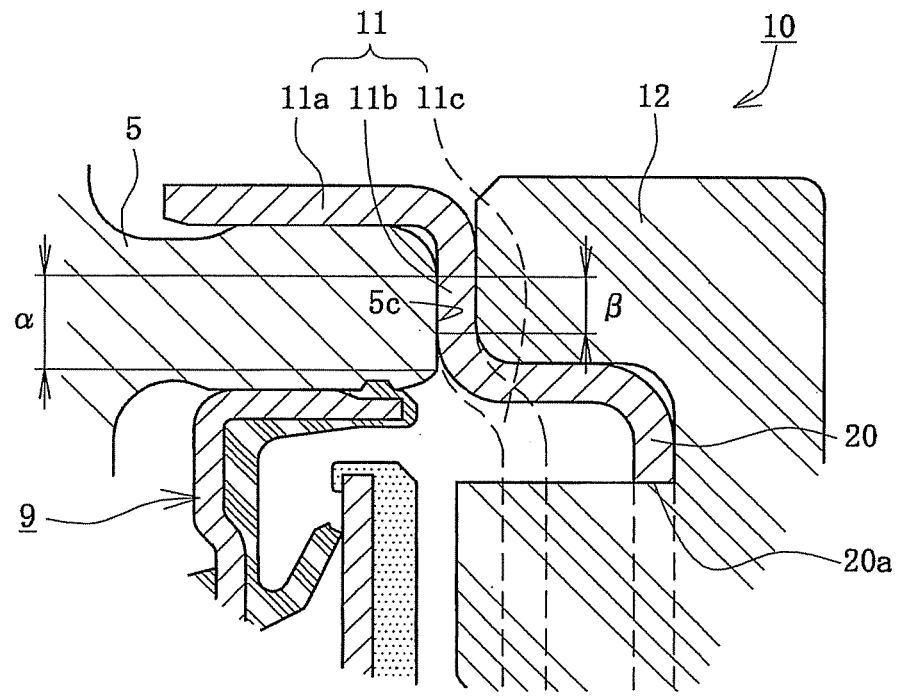

[Fig 4]
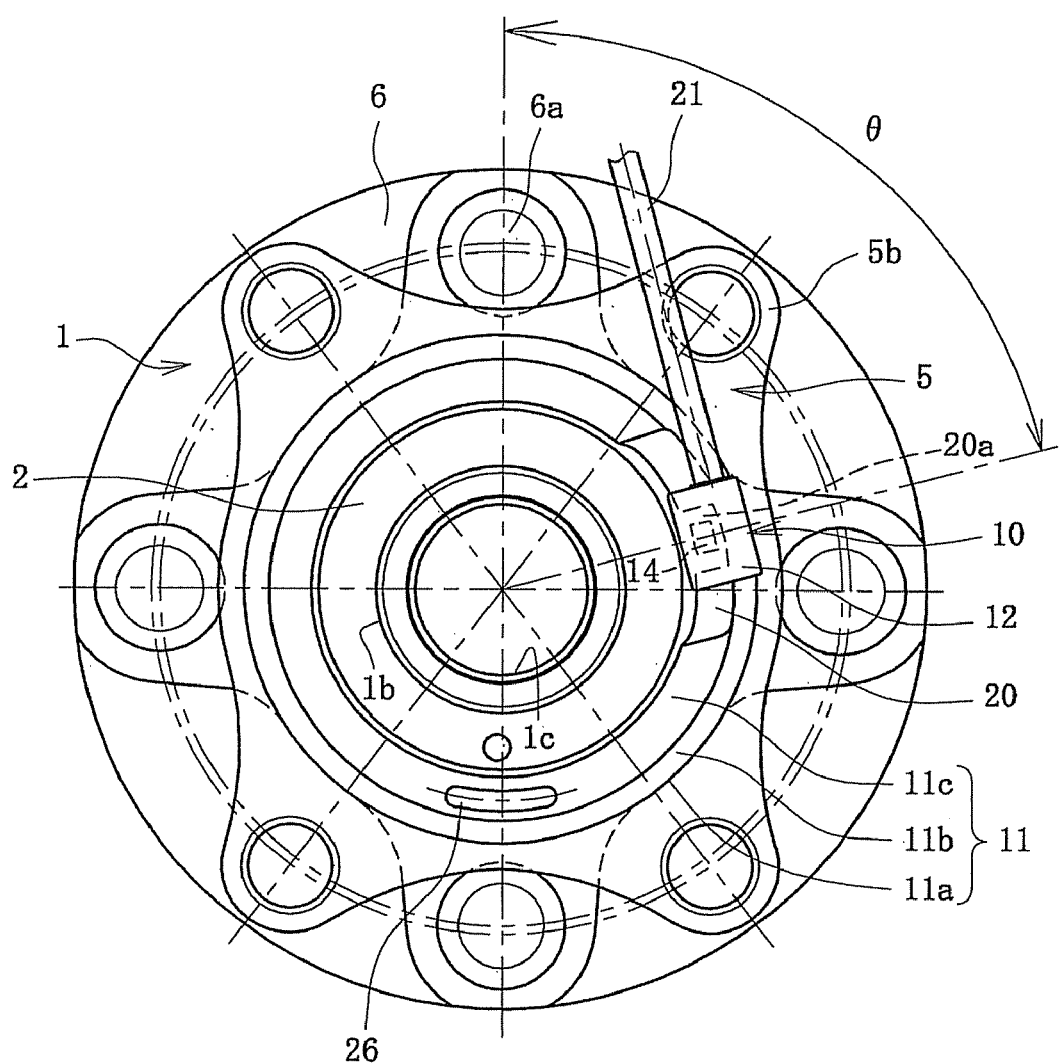

[Fig 5]
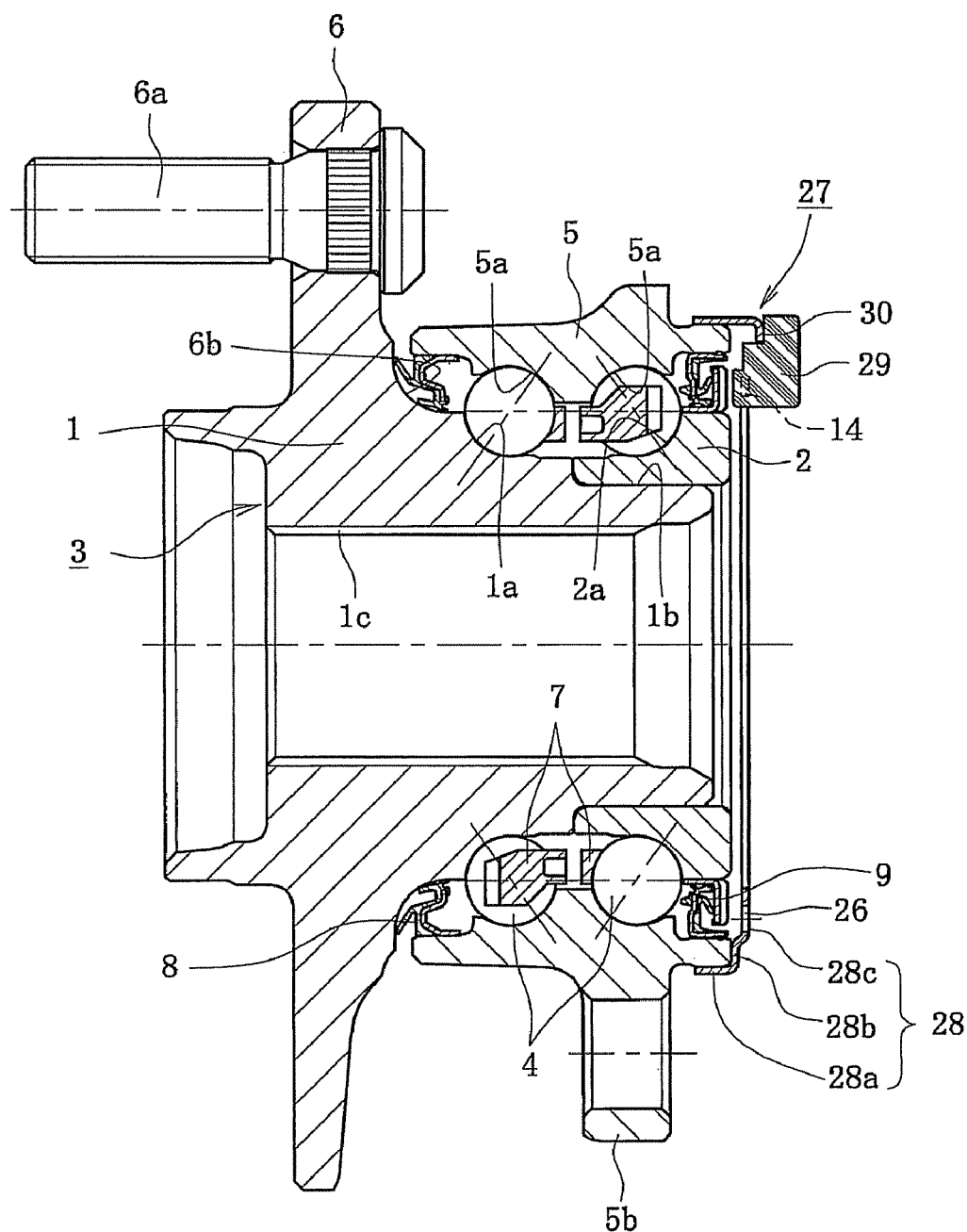

[Fig 6]
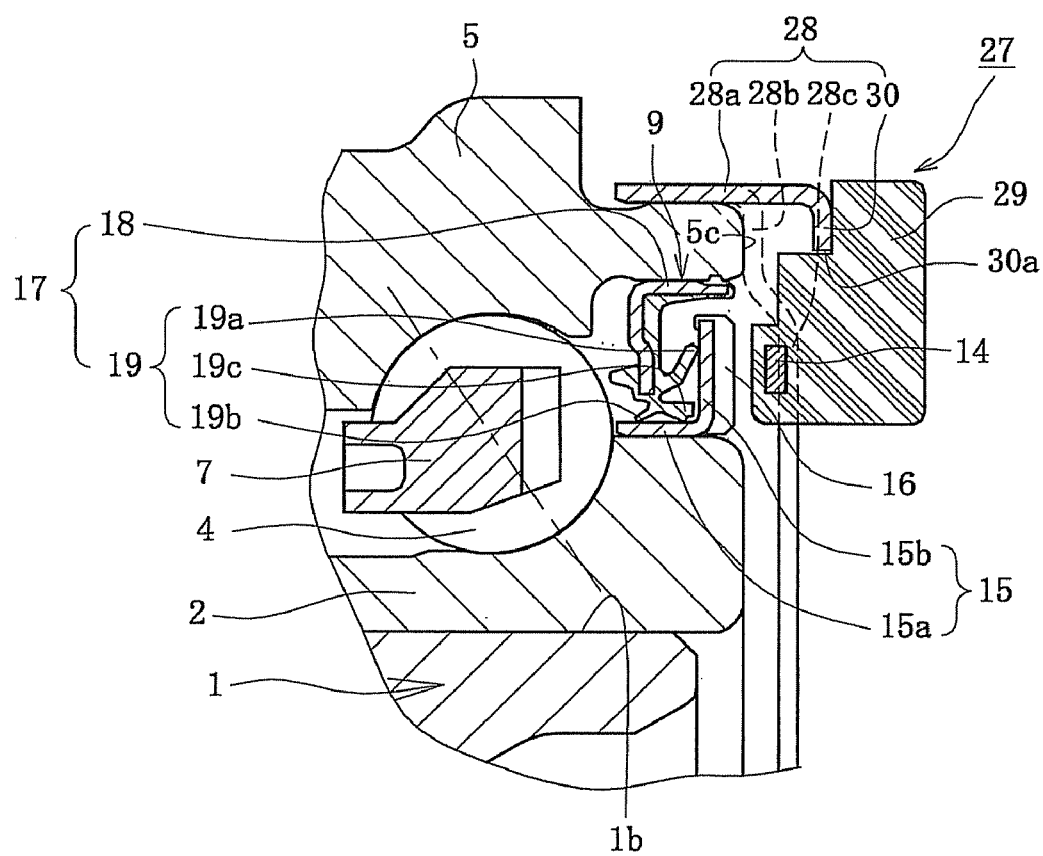

[ Fig 7 ]
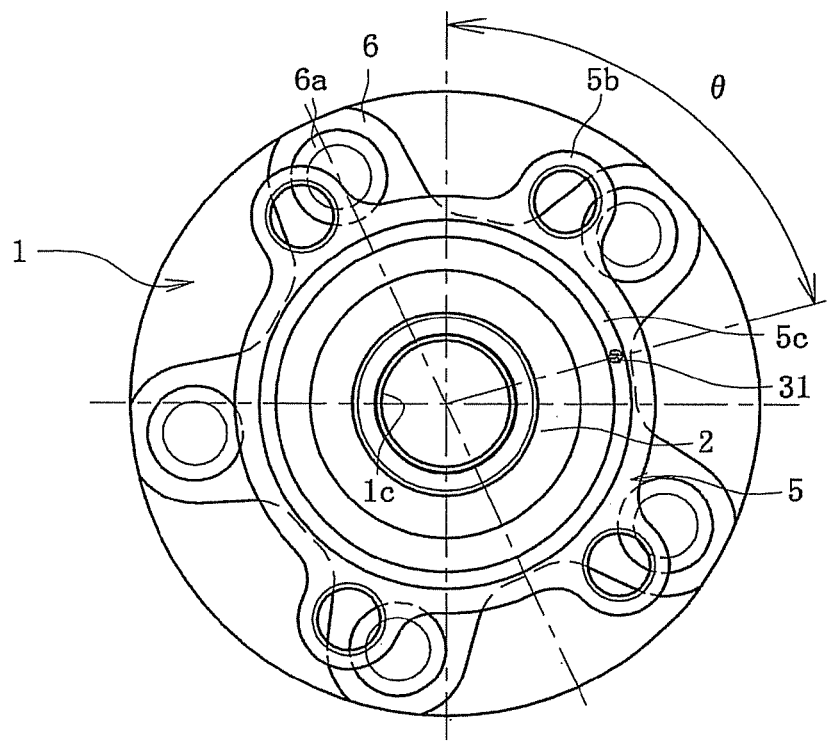
[ Fig 8 ]
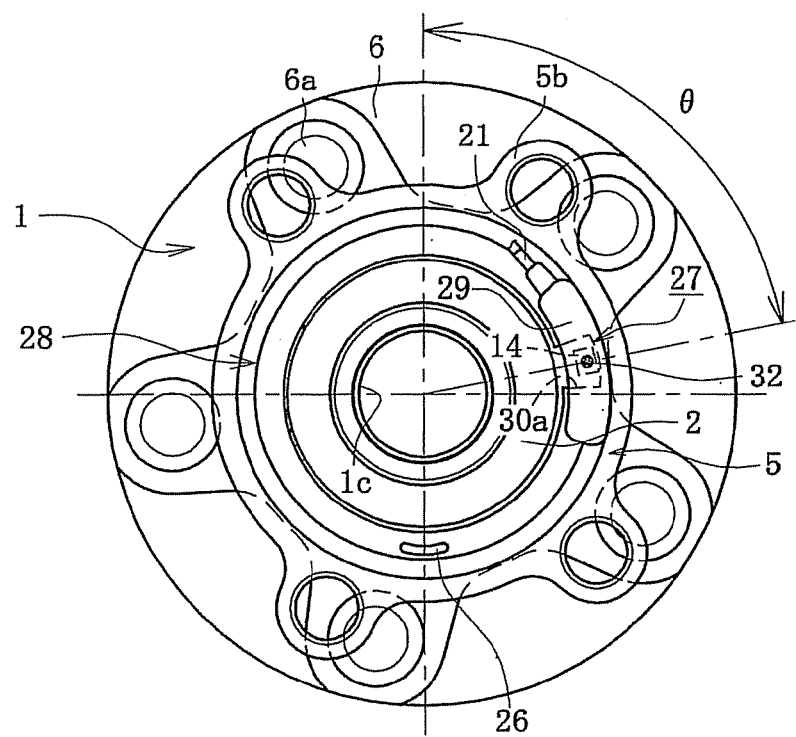

[ Fig 9 ]
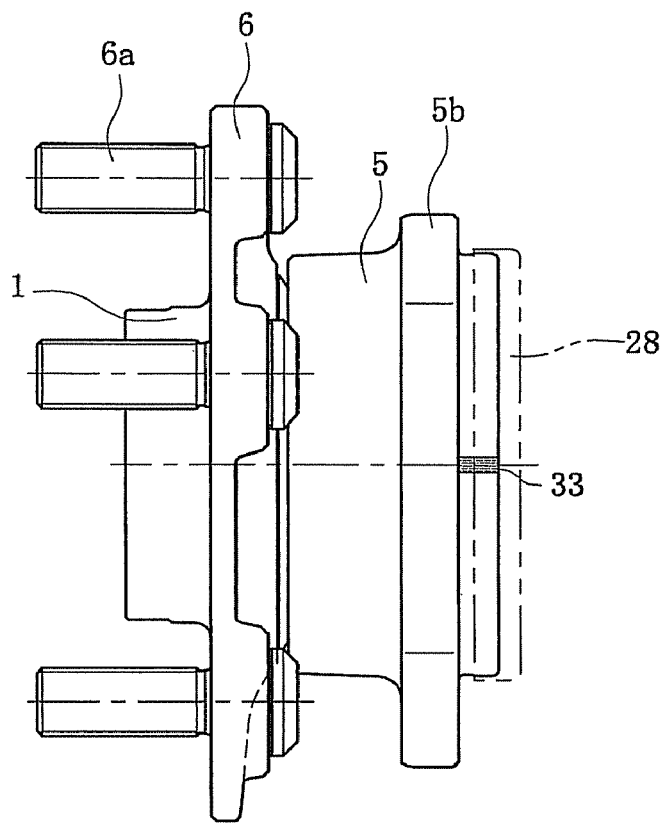
[ Fig 10 ]
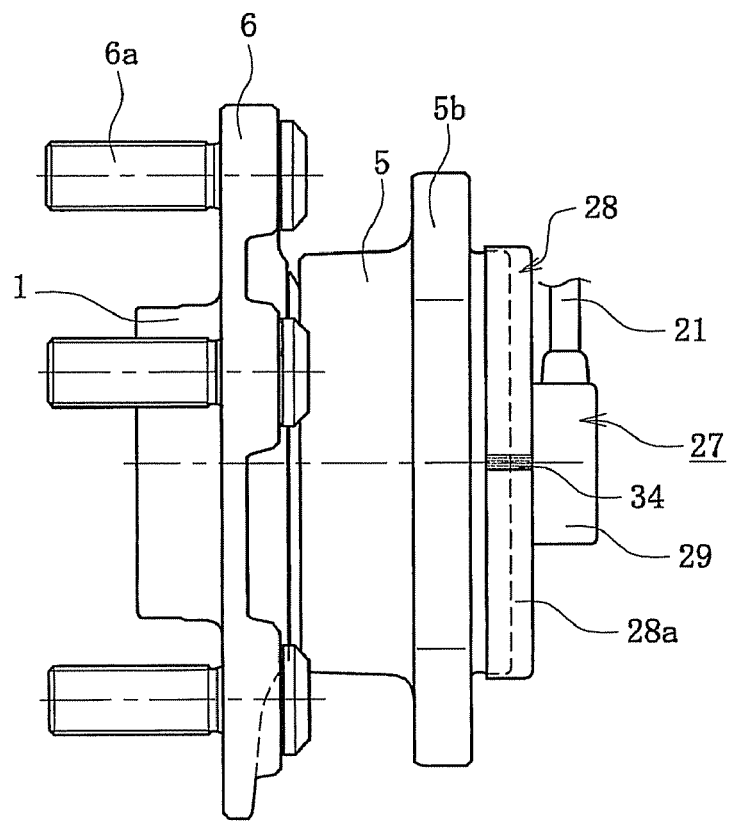

[Fig 11]
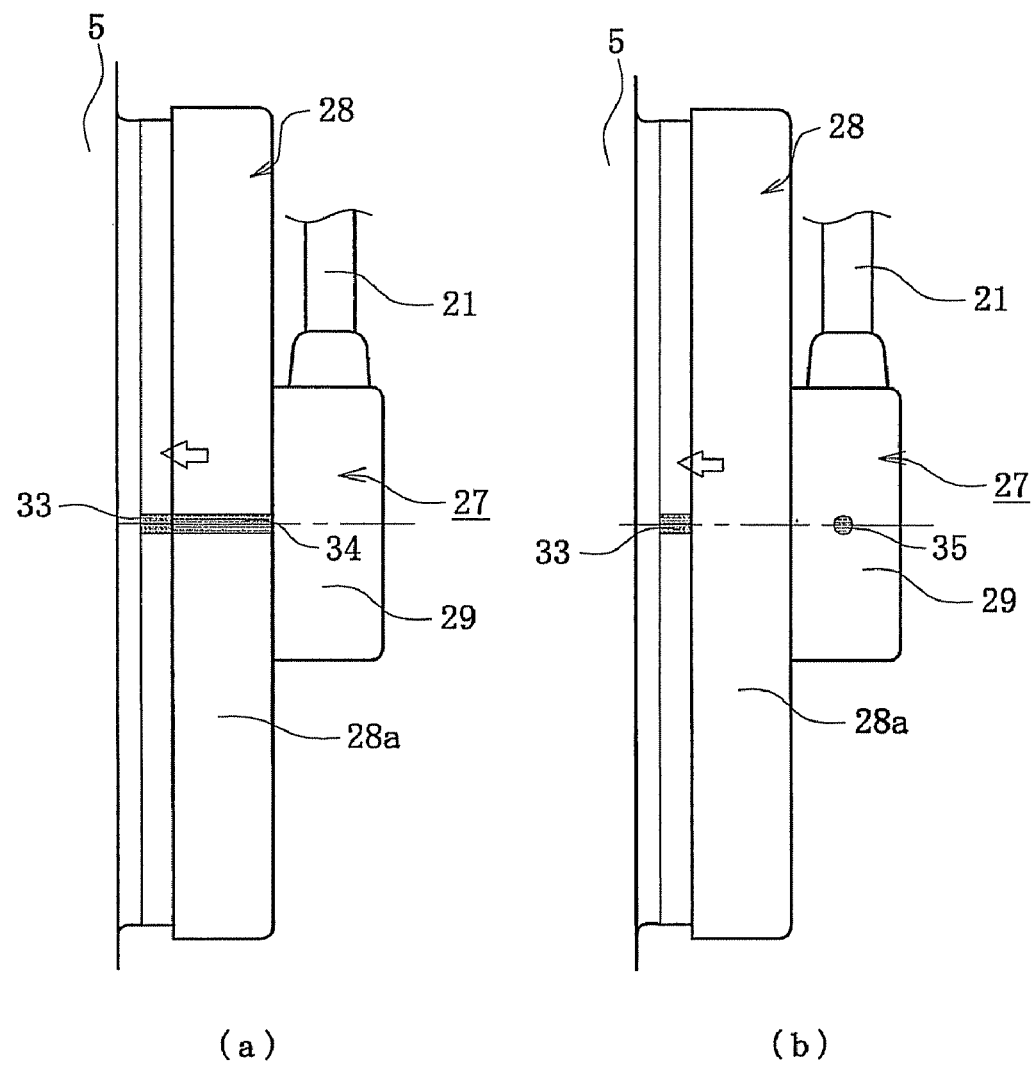
(a)   (b)

[Fig 12]
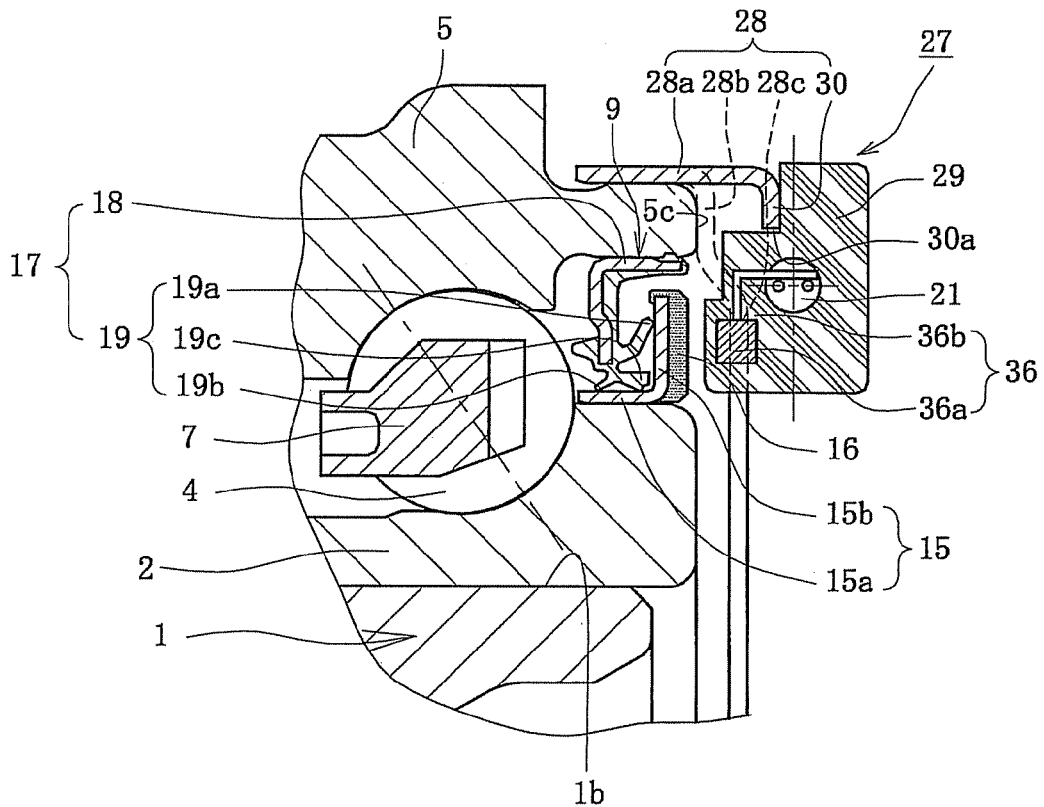
[Fig 13]
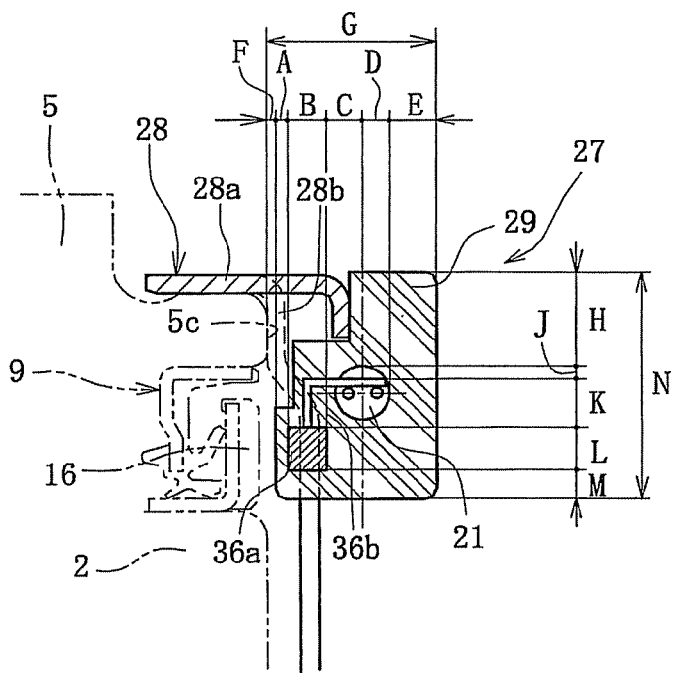

[ Fig 14 ]
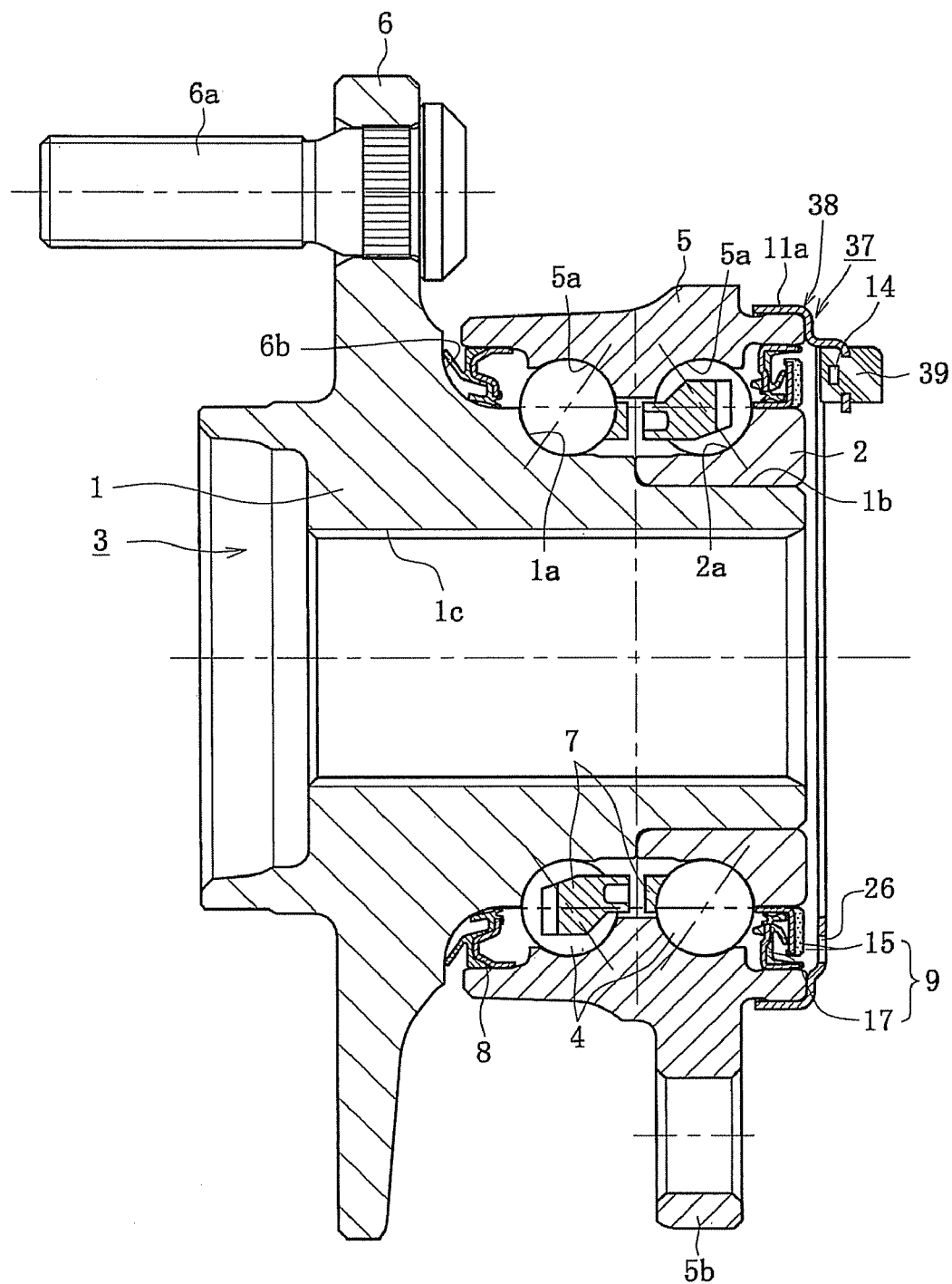

[Fig 15]
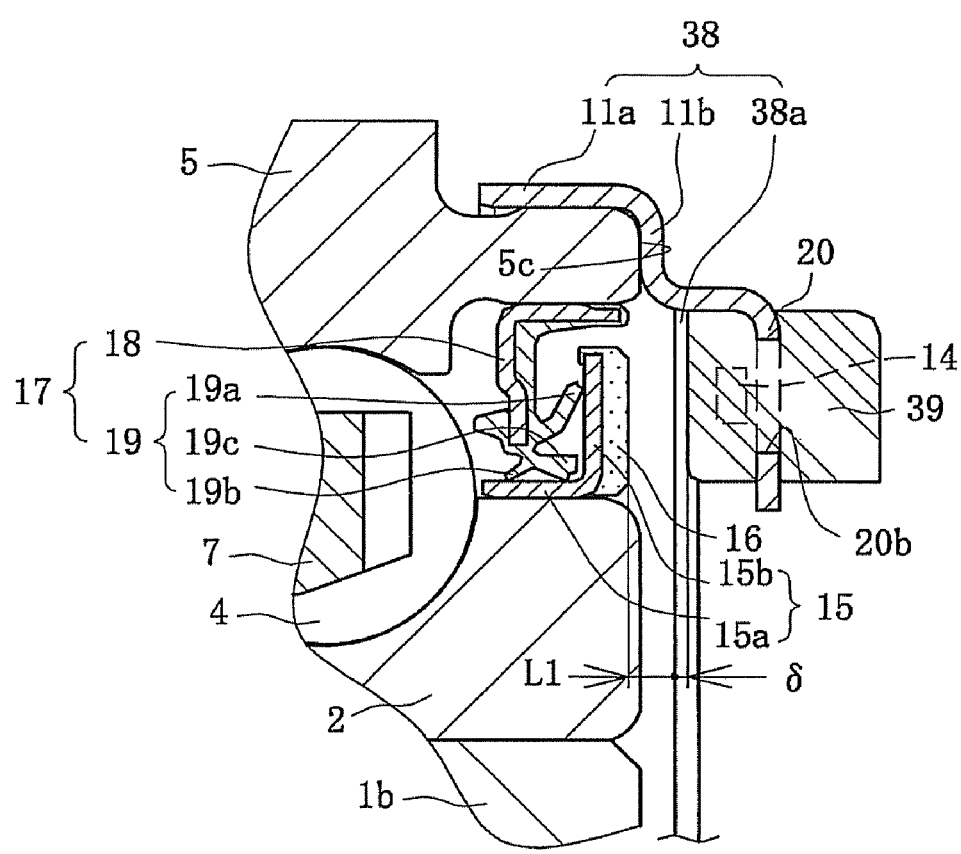

[Fig 16]
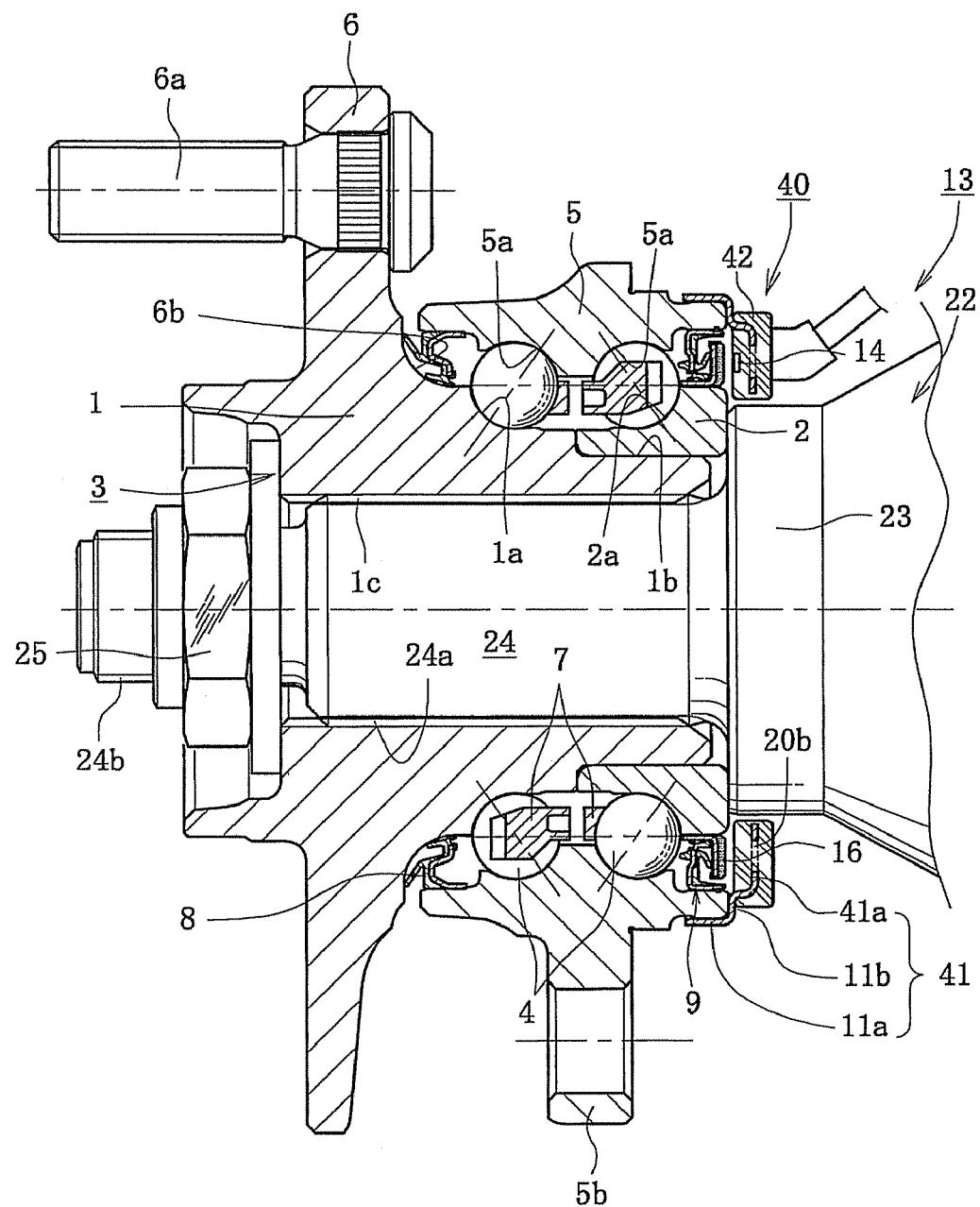

[Fig 17]
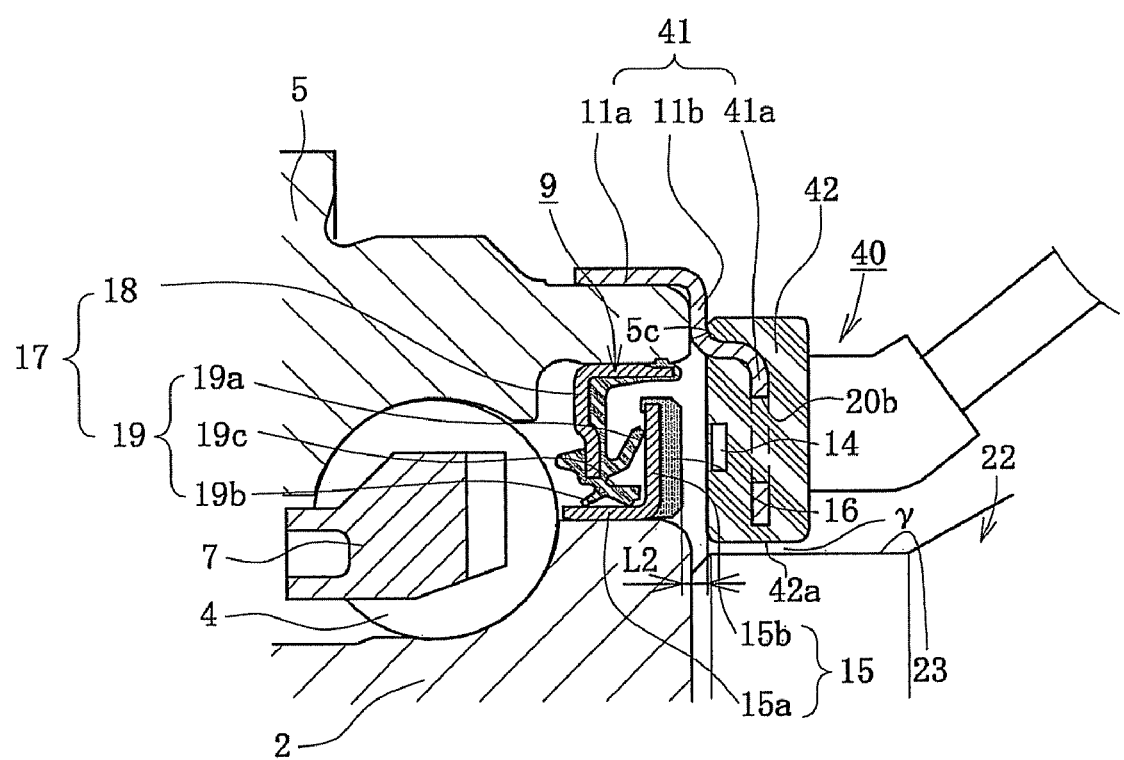

[Fig 18]
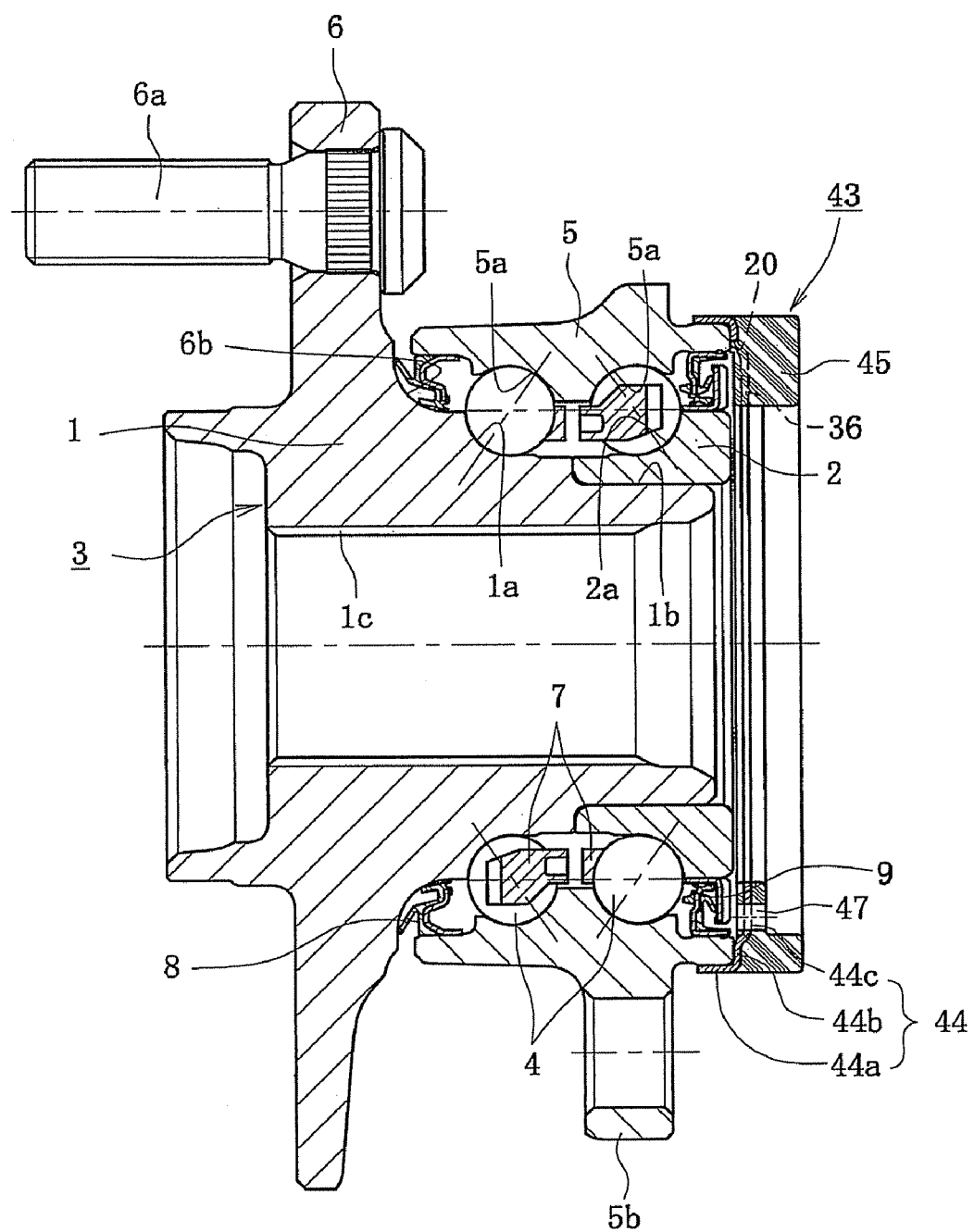

[Fig 19]
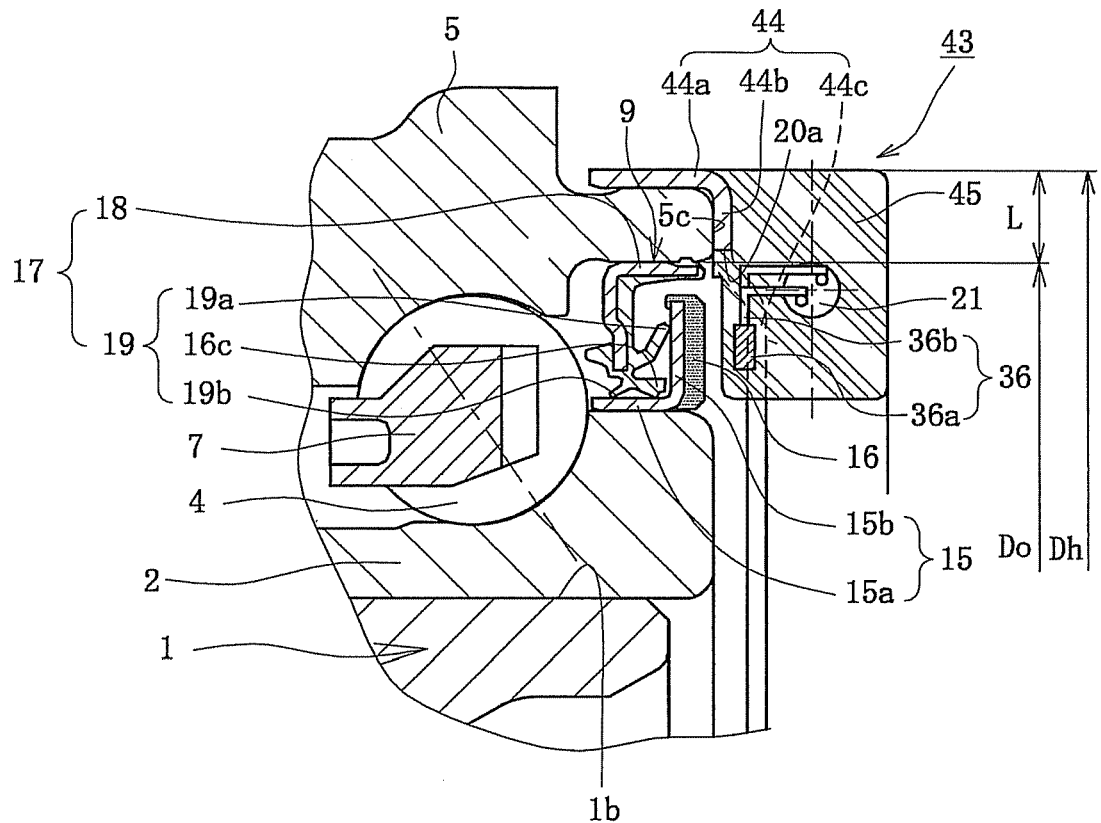
[Fig 20]
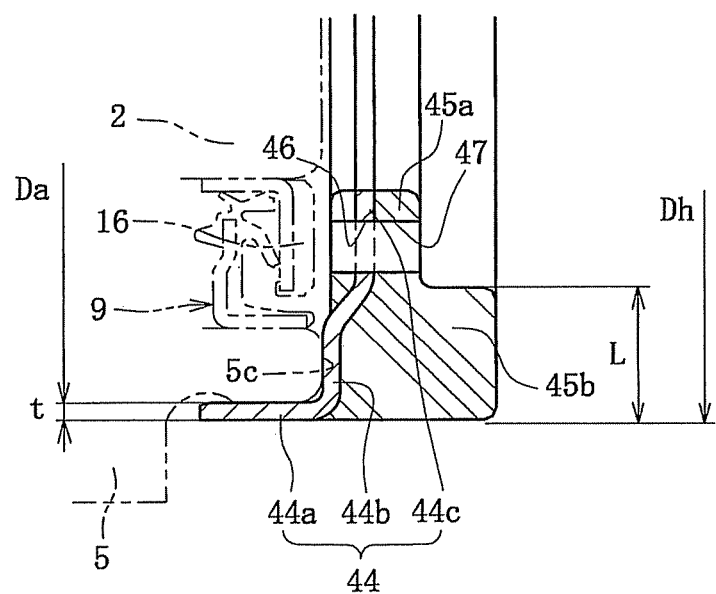

[Fig 21]
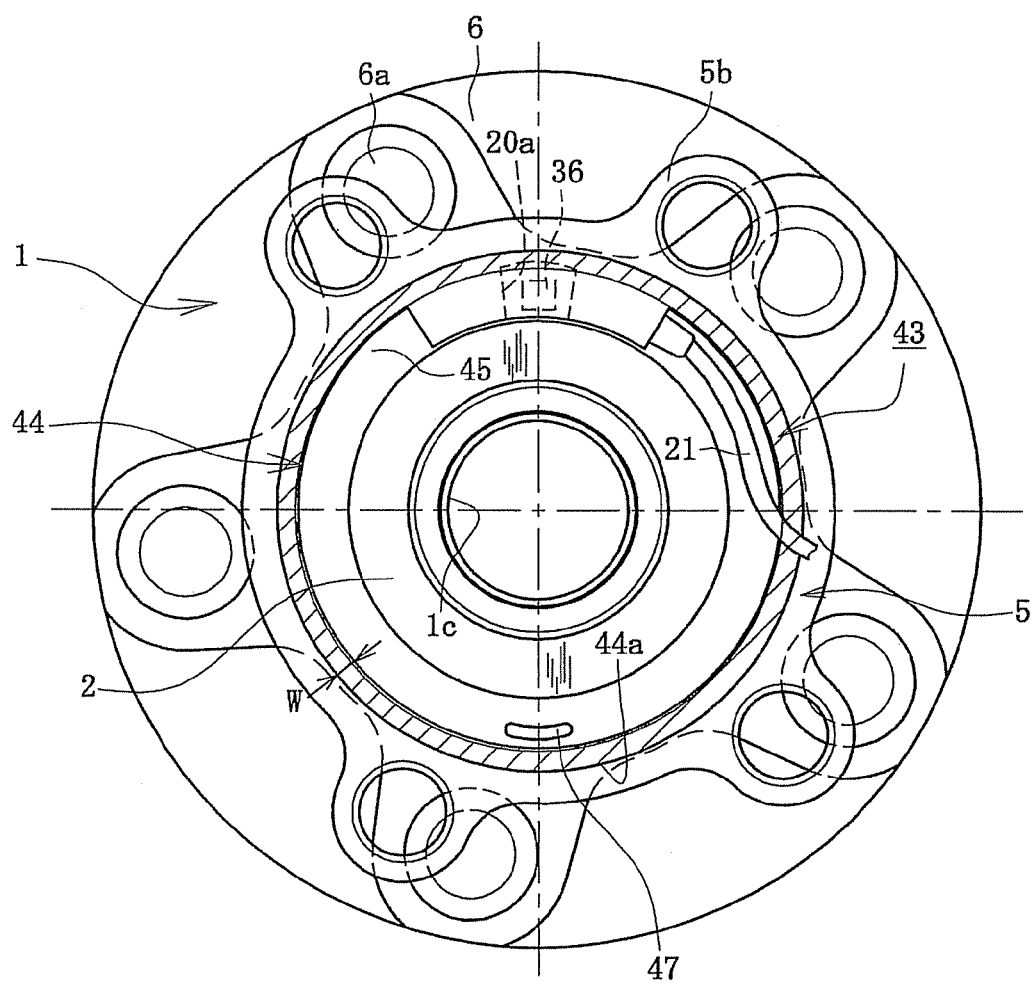

[Fig 22]
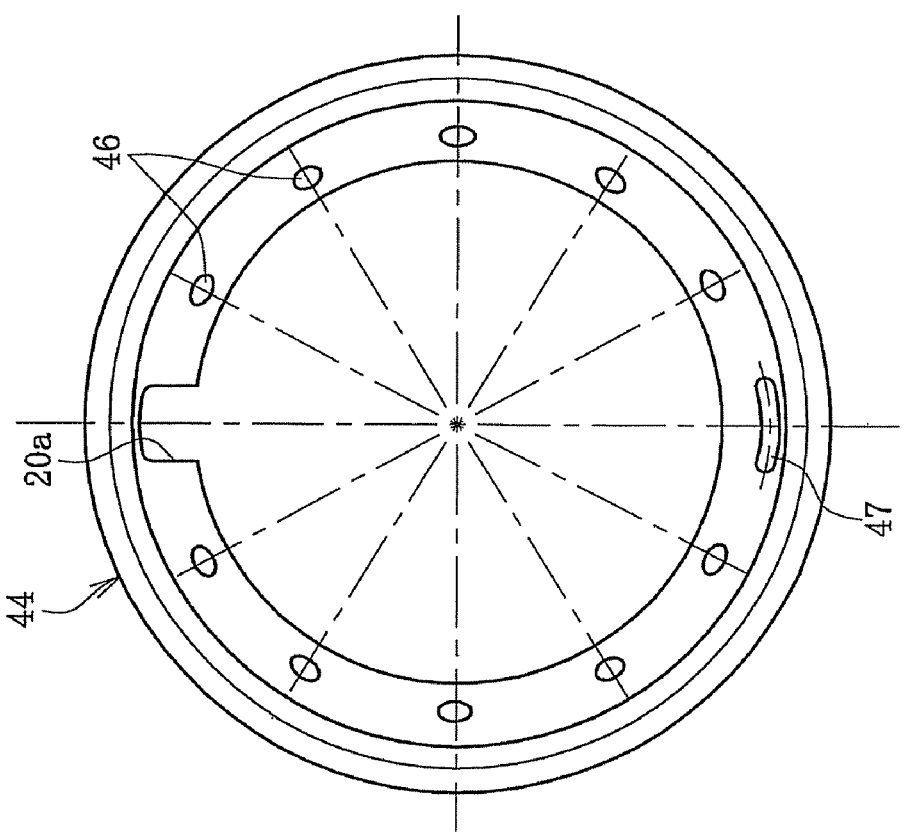
(b)
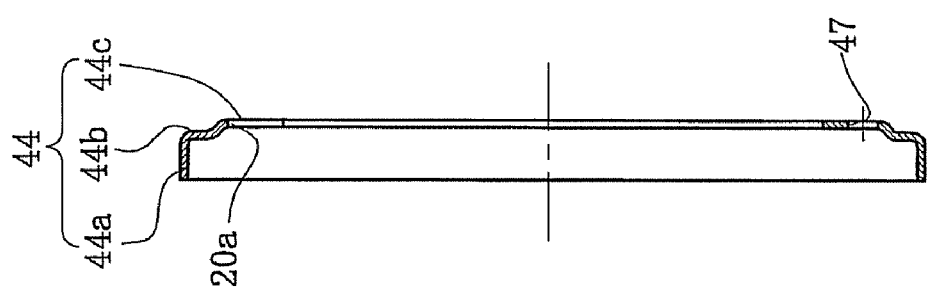
(a)

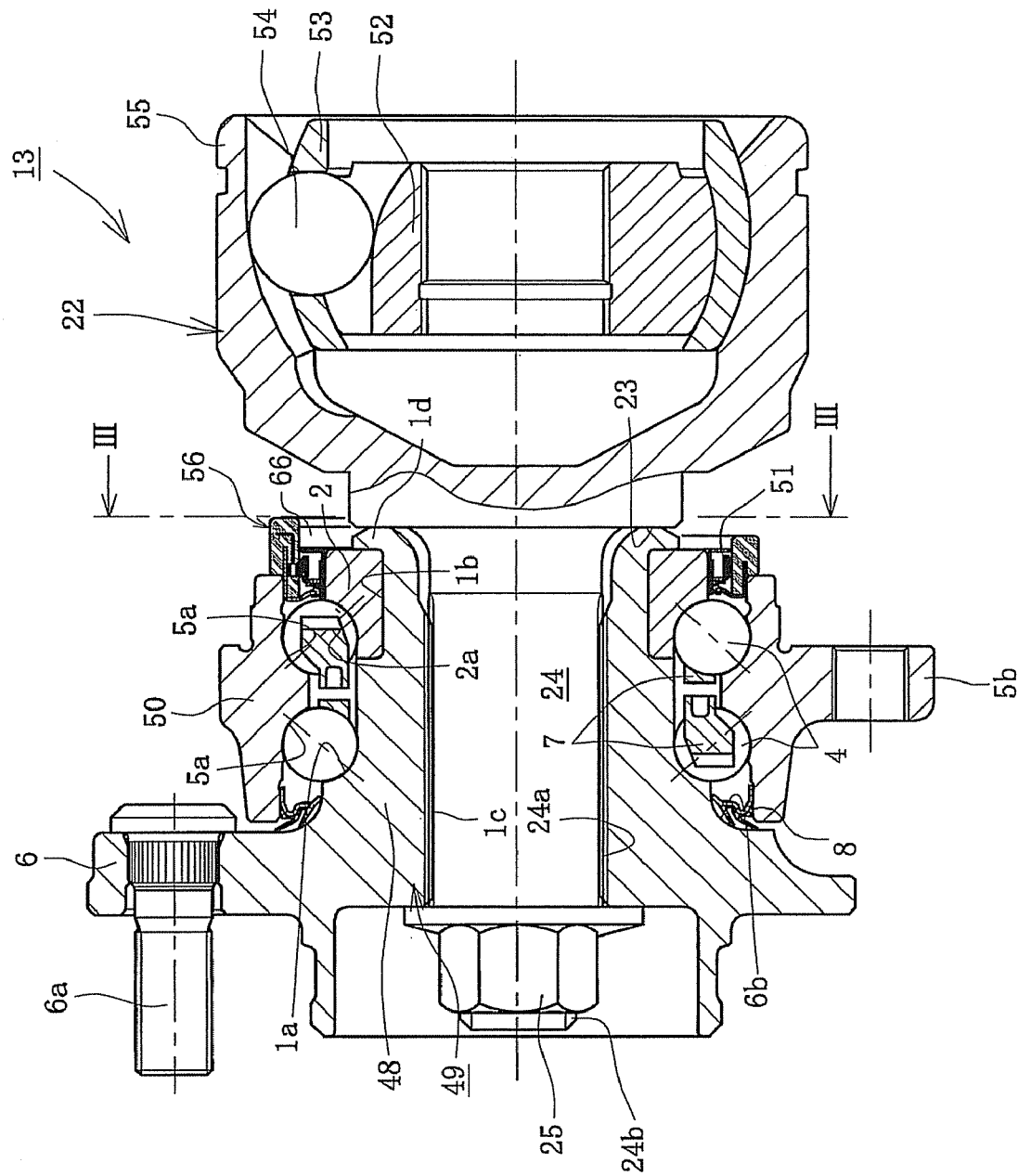
[ Fig 23 ]

[Fig 24]
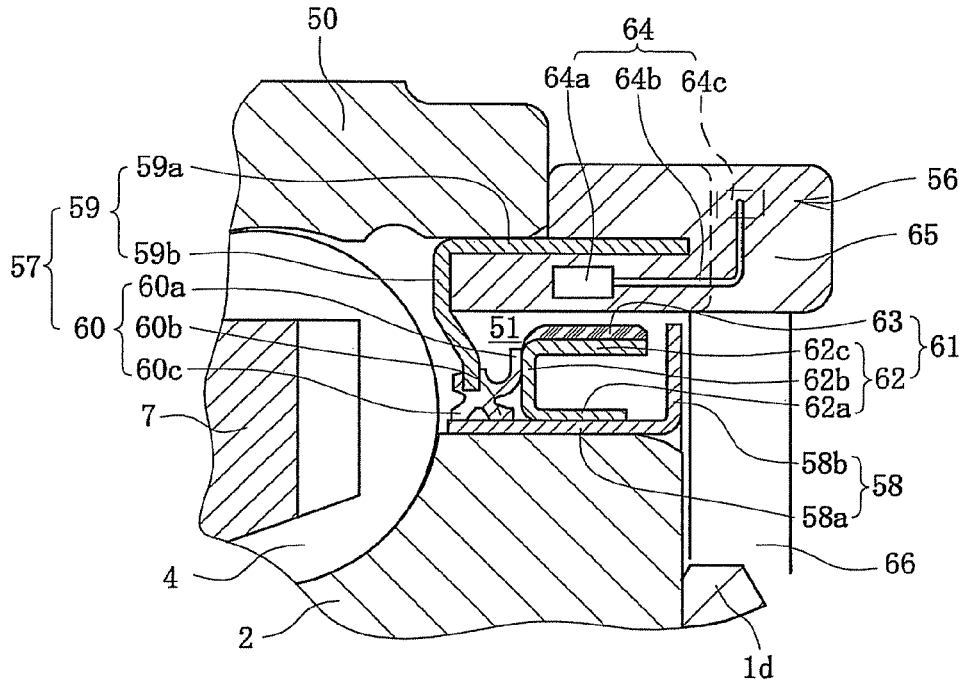
[Fig 25]
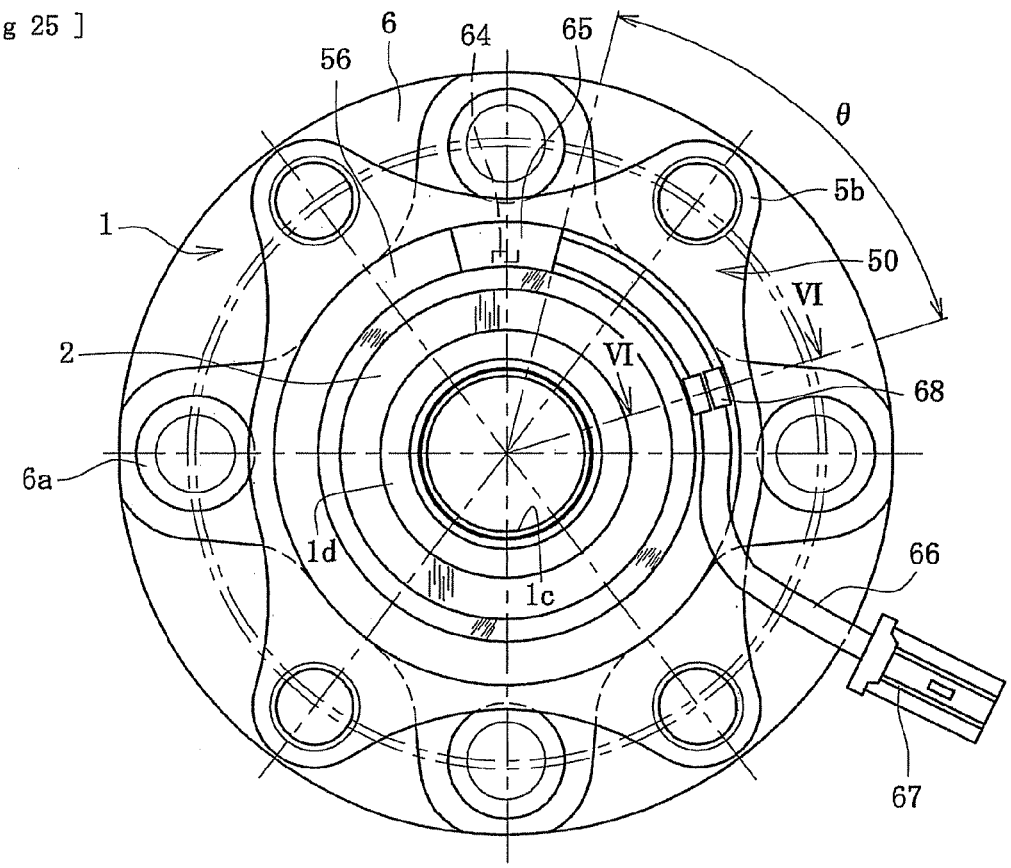

[Fig 26]
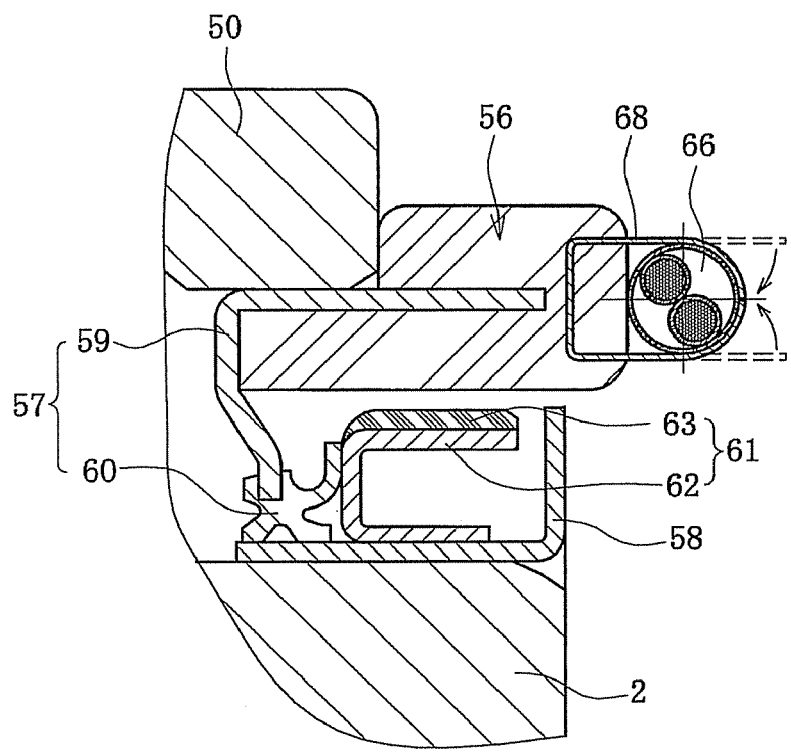
[Fig 27]
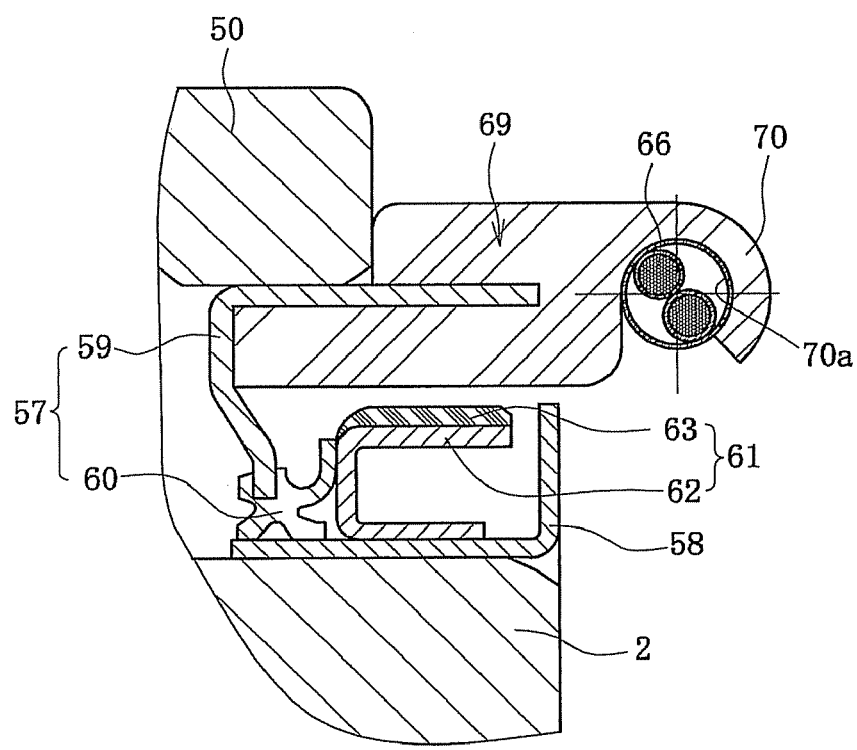

[ Fig 28 ]
PRIOR ART
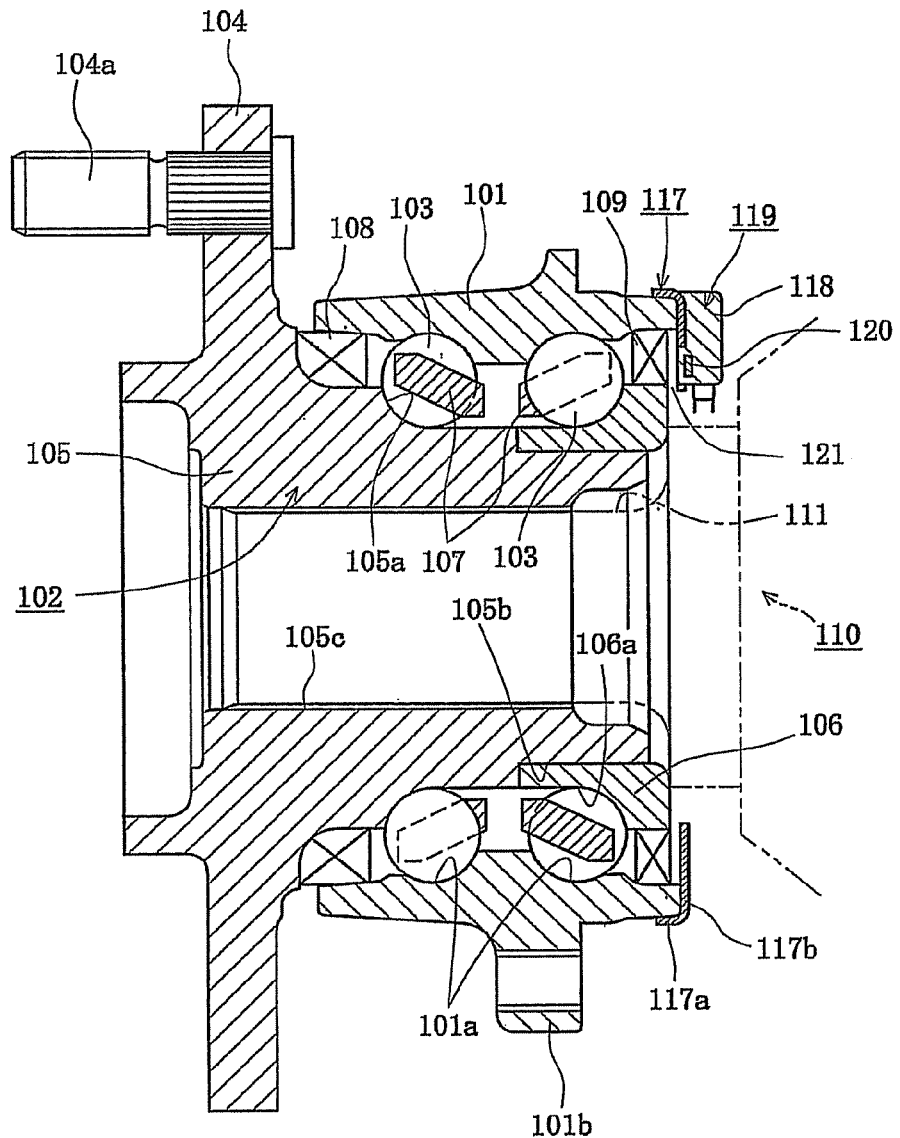

[Fig 29]
PRIOR ART
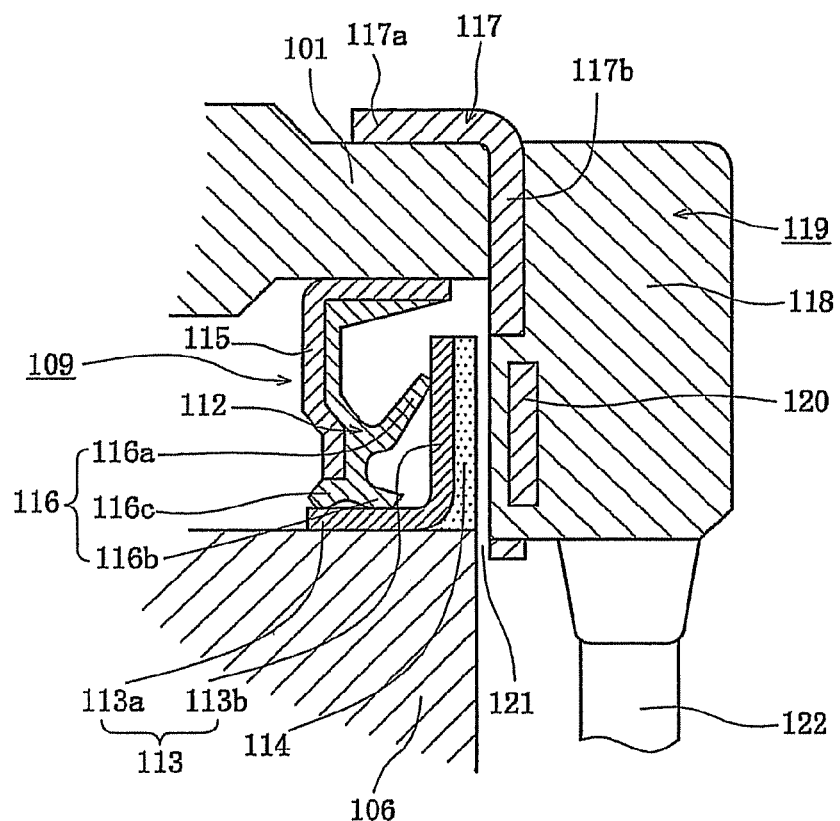

[ Fig 30 ]
PRIOR ART
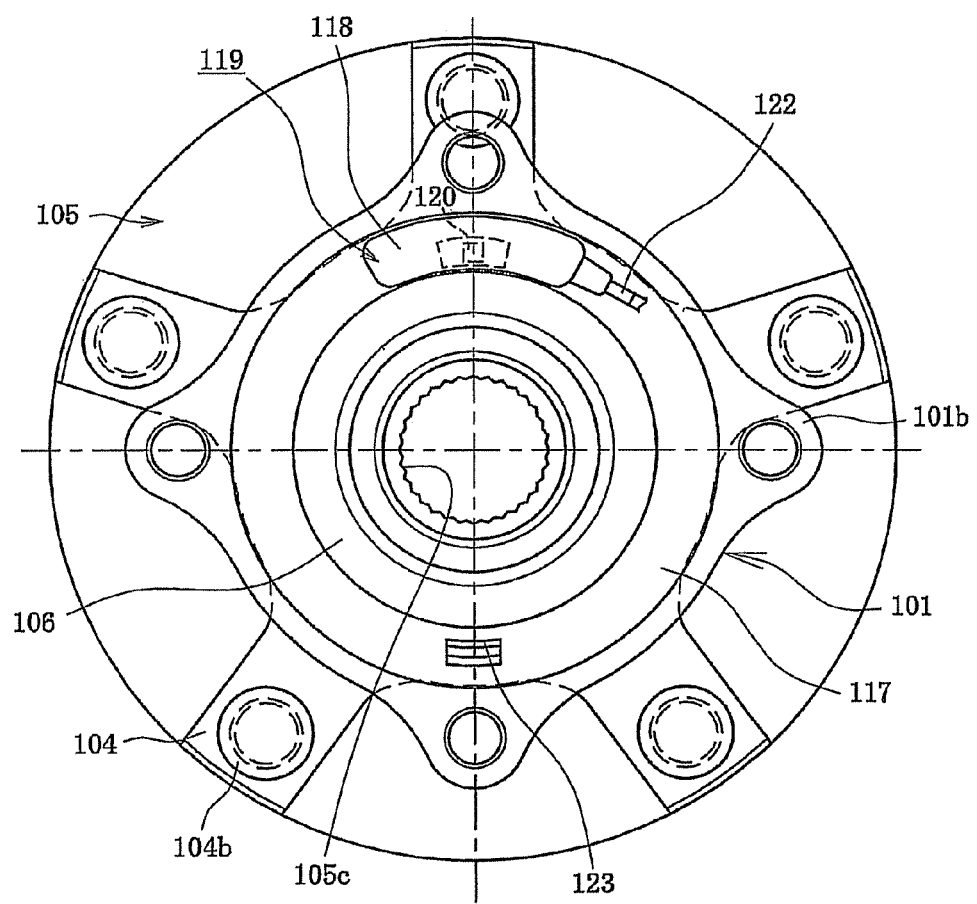

WHEEL BEARING APPARATUS INCORPORATED WITH A WHEEL SPEED DETECTING APPARATUS

CROSS-REFERENCE TO RELATED APPLICATIONS

This application is a continuation of International Application No. PCT/JP2008/001551, filed Jun. 17, 2008, that claims priority to Japanese Application Nos. 2007-161478, filed Jun. 19, 2007; 2007-172075, filed Jun. 29, 2007; 2007-178200, filed Jul. 6, 2007; 2007-179278, filed Jul. 9, 2007; 2007-202534, filed Aug. 3, 2007; and 2007-217799, filed Aug. 24, 2007. The disclosures of the above applications are incorporated herein by reference.

FIELD

The present disclosure relates to a wheel bearing apparatus, incorporating a wheel speed detecting apparatus, that rotationally supports a wheel of an automobile, etc.

BACKGROUND

It is generally known that a wheel bearing apparatus incorporating a wheel speed detecting apparatus can support a vehicle wheel relative to a suspension apparatus and can detect the wheel speed to control the anti-lock braking system (ABS). Such a bearing apparatus generally includes a wheel speed detecting apparatus. The detecting apparatus includes a magnetic encoder with magnetic poles alternately arranged along its circumference and integrated in a sealing apparatus arranged between inner and outer members for containing rolling elements therebetween. A wheel speed detecting sensor detects the variation in the magnetic poles of the magnetic encoder according to the rotation of the wheel.

The wheel speed sensor is usually mounted on a knuckle after the wheel bearing apparatus is mounted on the knuckle to form a suspension apparatus. Recently, a wheel bearing apparatus incorporating a wheel speed detecting apparatus has been proposed where a wheel speed detecting sensor is incorporated into the wheel bearing. Such a device reduces the size of the wheel bearing apparatus as well as eliminates troublesome in air gap adjustment between the wheel speed sensor and the magnetic encoder.

An example of the wheel bearing apparatus incorporating a wheel speed detecting apparatus is shown in FIG. 28. The wheel bearing apparatus incorporating a wheel speed detecting apparatus includes an outer member 101 secured on a suspension apparatus (not shown) of a vehicle forming a secured member. An inner member 102 is inserted into the outer member 101, via a plurality of balls 103, 103. The outer member is integrally formed on its outer circumference with a body mounting flange 101b. The outer member inner circumference includes double row outer raceway surfaces 101a, 101a.

The inner member 102 includes a wheel hub 105 and an inner ring 106. The wheel hub 105 and inner ring 106 are formed with double row inner raceway surfaces 105a, 106a, respectively, that are positioned opposite to the double row outer raceway surfaces 101a, 101a. One inner raceway surface 105a is formed on the outer circumference of the wheel hub 105 and the other inner raceway surface 106a is formed on the outer circumference of the inner ring. The inner ring 106 is press-fit onto a cylindrical portion 105b that axially extends from the inner raceway surface 105a of the wheel hub 105. Double row balls 103, 103 are contained between these double row outer and inner raceway surfaces. The balls are rollably held by cages 107, 107.

The wheel hub 105 is integrally formed with a wheel mount flange 104 to mount a wheel (not shown). Hub bolts 104a are secured on the flange 104 at circumferentially equidistant positions. The wheel hub 105 is further formed with a serration 105c on its inner circumference. A stem portion 111 of an outer joint member 110, that forms a constant velocity universal joint, is inserted into the serration 105c. Seals 108, 109 are mounted on both ends of the outer member 101. The seals 108, 109 prevent leakage of grease contained within the bearing and the entry of rainwater or dusts from the outside into the bearing.

As shown in FIG. 29, the inner side seal 109 includes a first sealing plate 112. The plate 112 has an L shaped cross-section and is adapted to fit into the inner circumference of the outer member 101. A second sealing plate 113 has an L shaped cross-section and is adapted to be arranged opposite to the first sealing plate 112. The second sealing plate 113 includes a cylindrical portion 113a adapted to fit onto the inner ring 106. A standing portion 113b extends radially outward from the cylindrical portion 113a. A magnetic encoder 114 is adhered to the inner side surface of the standing portion 113b, via vulcanized adhesion. The magnetic encoder 114 is formed from a rubber mingled with magnetic powder. Also, it includes magnetic N and S poles alternately arranged along its circumferential direction.

The first sealing plate 112 includes a metal core 115 with an L shaped cross-section. A sealing member 116 is adhered to the metal core 115, via vulcanized adhesion. The sealing member 116 includes a side lip 116a in sliding contact with the outer side surface of the standing portion 113b of the second sealing plate 113. A pair of radial lips 116b, 116c is in sliding contact with the cylindrical portion 113a of the second sealing plate 113.

An annular sensor holder 119 is mounted on the end of the outer member 101. The annular sensor holder 119 includes a fitting cylinder 117 and a holding portion 118 joined to the fitting cylinder 117. The fitting cylinder 117 includes a cylindrical fitting portion 117a. A flange portion 117b extends radially inward from the fitting portion 117a. The fitting cylinder has a wholly annular configuration with an L shaped cross-section.

The holding portion 118 is integrally molded and embedded with a wheel speed sensor 120. The speed sensor 120 opposes the encoder 114, via a predetermined air gap. The wheel speed sensor 120 includes a magnetic detecting element such as a Hall effect element, magnetic resistance element (MR element) etc. to change its characteristics in accordance with the flow direction of magnetic flux. An IC incorporating a wave forming circuit for rectifying the output wave form of magnetic detecting element is also included.

A labyrinth seal is formed by a small gap 121 between the end face of the inner ring 106 and the flange portion 117b. The labyrinth seal can prevent foreign matter such as magnetic powder etc. from entering into a space between the magnetic encoder 114 and the wheel speed sensor 120 before the stem portion 111 of the outer joint member 110 is inserted into the wheel hub 105. This includes transportation of the bearing apparatus to an assembling line of a manufacturer of automobiles. Thus, it is possible to improve the reliability of wheel speed detection. Reference Patent Document 1: Japanese Laid-open Patent Publication No. 254985/2003.

However, in the prior art wheel bearing apparatus incorporating a wheel speed detecting apparatus, since the sensor holder 119 is arranged between a knuckle (not shown) and the outer joint member 110, it is believed that foreign matter, such as muddy water etc., would enter into the bearing apparatus through an annular space between the outer joint member 110 and the knuckle. Thus, this would detract from the detecting accuracy of wheel speed. In addition, it is also believed that foreign matter may enter and solidify on rotational parts of the wheel bearing. The dry matter would be blown off by a centrifugal force and damage surfaces of the magnetic encoder 114 and the holding portion 118. Accordingly, it is difficult to maintain the reliability of wheel speed detection for a long term.

In addition it is also believed that a suitable air gap (labyrinth) would not be formed, due to formation of a gap between the flange portion and the end face of the outer member 101, if the fitting portion 117a of the fitting cylinder 117 is press-fit obliquely or incorrectly onto the outer member 101.

It is also believed that the length of the harness 122 (FIG. 30) would be insufficient after assembly of the bearing apparatus and damaged. Foreign matter once entered into the bearing apparatus could not be surely discharged from the bearing apparatus. Accordingly, it stays in the bearing apparatus and solidified due to erroneous positioning of a draining aperture 123 of the fitting cylinder 117. If the fitting cylinder 117 is erroneously press-fit onto the outer member 101 in its circumferential direction, the holding portion 118 joined to the fitting cylinder 117 is also erroneously positioned relative onto the outer member 101. Thus, foreign matter entered and solidified on rotational parts of the wheel bearing would be blown off by a centrifugal force and damage surfaces of the magnetic encoder 114 and the holding portion 118. Accordingly, it is difficult to maintain the reliability of wheel speed detection for a long term.

Furthermore, since the holding portion 118 of the sensor holder 119 is not strictly limited in a projection amount from the end face of the outer member 101 and in a radial thickness, it is believed that the holding portion 118 will interfere with the outer joint member 110. In addition, it is believed that the holding portion 118 would be damaged when the harness 122 is taken out from the holder portion and caught by anything during transportation of the bearing apparatus. Especially in cold environments, the holding portion 118 would be liable to be damaged by an excessive load applied to the mounting portion of the harness 122 during steering of the vehicle wheels since the harness 122 would be in a frozen condition.

SUMMARY

It is, therefore, an object of the present disclosure to provide a wheel bearing apparatus incorporating a wheel speed detecting apparatus that prevents entry of foreign matter into the detecting portion. Also, it improves the workability and accuracy during assembly of the sensor holder and thus the accuracy of detection of the wheel speed.

It is another object to provide a wheel bearing apparatus incorporating a wheel speed detecting apparatus that can improve the strength and rigidity of the sensor holder by optimizing its size. Also, it prevents interference of the sensor holder with surrounding parts of a vehicle.

To achieve the above mentioned objects, a wheel bearing apparatus incorporating a wheel speed detecting apparatus comprises an outer member formed with a body mounting flange on its outer circumference. The body mounting flange is to be mounted on a suspension apparatus of a vehicle. The outer member inner circumference includes double row outer raceway surfaces. An inner member includes a wheel hub and at least one inner ring. The wheel hub is integrally formed with a wheel mounting flange on its one end. A cylindrical portion axially extends from the wheel mounting flange. The inner ring is press-fit onto the cylindrical portion of the wheel hub. The wheel hub and the inner ring are formed on their outer circumferences with one of the double row inner raceway surfaces. The inner raceway surfaces oppose the double row outer raceway surfaces. Double row rolling elements are rollably contained between the inner and outer raceway surfaces. Seals are mounted in annular openings formed between the outer member and the inner member. A sensor holder, including an annular cover, is press-fit onto the outer circumference of an inner side end portion of the outer member. A holding portion is joined to the cover and is made from a synthetic resin that has a wheel speed sensor. A pulser ring is arranged on the outer circumference of the inner ring. The pulser ring has alternately and equidistantly varying circumferential characteristics. The pulser ring is arranged opposite to the wheel speed sensor, via a predetermined axial gap. The cover comprises a cylindrical fitting portion adapted to be press-fit onto the inner side end portion of the outer member. A flange portion extends radially inward from the fitting portion. The flange portion is adapted to be in close contact with the end face of the outer member. A bottom portion extends further radially inward from the flange portion. The holding portion is integrally joined to the bottom portion. The flange portion is formed with a flat surface so that it forms an abutting width larger than 5 mm or more, against the end face of the outer member, or larger than 50% or more, relative to the flat width of the end face of the outer member.

The wheel bearing apparatus incorporating a wheel speed detecting apparatus has a sensor holder including an annular cover press-fit onto the outer circumference of an inner side end portion of the outer member. A holding portion is joined to the cover and made of synthetic resin that includes a wheel speed sensor. The cover has a cylindrical fitting portion adapted to be press-fit onto the inner side end portion of the outer member. A flange portion extends radially inward from the fitting portion and is adapted to be in close contact with the end face of the outer member. A bottom portion extends further radially inward from the flange portion. The holding portion is integrally joined to the bottom portion. The flange portion is formed with a flat surface so that it forms an abutting width larger than 5 mm or more, against the end face of the outer member, or larger than 50% or more, relative to the flat width of the end face of the outer member. Thus, it is possible to provide a wheel bearing apparatus incorporating a wheel speed detecting apparatus that improves the positioning accuracy of the cover by achieving close contact between the cover and the outer member. This prevents the cover from being press-fit obliquely or incorrectly onto the outer member. Accordingly, it improves the assembling accuracy of the sensor holder as well as the detection accuracy.

An inner side seal of the seals includes an annular sealing plate with a metal core press-formed from steel plate with a substantially L shaped cross-section. The sealing plate is adapted to be fit into the inner side end of the outer member. A sealing member is integrally joined to the metal core. A slinger is press-formed from a steel plate with a substantially L shaped cross-section. The slinger is adapted to be fit onto the outer circumference of the inner ring. A magnetic encoder is integrally joined to the inner side surface of the slinger. The magnetic encoder is made of an elastomer mingled with magnetic powder and magnetized with N and S poles alternately arranged in a circumferential direction.

A securing portion is formed on the bottom portion of the cover. It projects from the bottom portion toward the inner side at a radially outer portion of the bottom portion. The holding portion is arranged over a region beyond the outer circumference of the securing portion to the fitting portion.

This makes it possible to assure a space for the holding portion and to increase the flat surface of the flange portion while further extending the flange portion radially inward.

A harness extends from the holding portion tangentially to the cover. This enables easy take out of the harness radially outward of a knuckle. Thus, this improves workability during assembly of the bearing apparatus.

The holding portion is arranged within a range of 30-90° from a vertical direction relative to the ground. This makes it possible to prevent an internal wiring in the holding portion from being subjected to an adverse effect caused by excessive bending of the harness relative to the holding portion. Also, it prevents detraction of the workability due to an unnecessary increase in the length of the harness.

A drain aperture is formed in the bottom portion of the cover at a position nearest to the ground. This enables easy discharge of foreign matter, such as muddy water or debris, from the bottom portion of the cover even if they might enter into the apparatus. Accordingly, it is possible to prevent parts of the bearing apparatus from being subjected to adverse effects by foreign matter.

The cover is formed from non-magnetic austenitic stainless steel sheet. This makes it possible to assure exact detection accuracy without giving any adverse effect to the sensitive performance of the wheel speed sensor.

The slinger is formed from ferromagnetic steel plate. This makes it possible to increase an output signal of the magnetic encoder. Thus, this assures stable detection accuracy.

The holding portion is formed from non-magnetic synthetic resin. This makes it possible to maintain the corrosion resistance, strength and durability of the bearing apparatus for a long term without giving any adverse effect to the sensitive performance of the wheel speed sensor.

The holding portion is formed from polyphenylene sulfide. This also makes it possible to maintain the corrosion resistance, strength and durability of the bearing apparatus for a long term without giving any adverse effect to the sensitive performance of the wheel speed sensor.

The holding portion includes 10-45 wt % of fiber reinforcing material including glass fiber. This makes it possible to use semicrystalline material at a temperature exceeding its glass transition temperature. Thus, this improves the heat resistance, the rigidity and the dimensional stability due to an increase of the elasticity modulus.

A mark is formed on a predetermined position of the inner side end of the outer member. Another mark is formed on a predetermined position of the sensor holder. The sensor holder is mounted on the outer member with the marks being aligned with each other. This makes it possible to exactly mount the sensor holder on the outer member while watching each mark. This improves the workability during assembly of the bearing apparatus. Thus, this provides a wheel bearing apparatus incorporating a wheel speed detecting apparatus with an improved reliability.

The mark on the outer member is formed by laser marking or painting.

The mark on the sensor holder is formed by painting or indenting.

A harness is connected to the wheel speed sensor to send an output signal of the wheel speed sensor to a controller. The signal is taken from the holding portion of the sensor holder. The radial dimension of the holding portion is limited to a range of 8.5-15.0 mm. An axially projected amount of the holding portion from the end face of the outer member is limited to a range of 8.5-20.0 mm. This provides a wheel bearing apparatus incorporating a wheel speed detecting apparatus that assures strength and rigidity to prevent breakage of the holding portion. Also, it improves the reliability while preventing interference with surrounding parts of the bearing apparatus and suspension.

The wheel speed sensor includes a magnetic detecting element to change its characteristics in accordance with the flow direction of magnetic flux. An IC incorporating a wave forming circuit to rectify the output wave form of magnetic detecting element is used. This makes it possible to reduce the size of the bearing apparatus and to achieve wheel speed detection with high reliability at a low cost.

The slinger is positioned and secured so that the inner side surface of the encoder is positioned in the same plane as that of the end face of the inner ring or in a position slightly retracted therefrom toward the inner side of the bearing apparatus. The outer side surface of the holding portion is arranged so that it does not project from the inner surface of the bottom portion of the cover. Thus, it is possible to prevent the surfaces of the magnetic encoder or the holding portion from being damaged by foreign matter, such as muddy water or debris, blown off by a centrifugal force. Thus, it is possible to stably and exactly maintain, for a long term, the gap between the magnetic encoder and the detecting portion of the wheel speed sensor.

The wheel bearing apparatus incorporating a wheel speed detecting apparatus includes an outer member formed with a body mounting flange on its outer circumference. The body mounting flange is to be mounted on a suspension apparatus of a vehicle. The outer member inner circumference includes double row outer raceway surfaces. An inner member includes a wheel hub and at least one inner ring. The wheel hub is integrally formed with a wheel mounting flange on one end. A cylindrical portion axially extends from the wheel mounting flange. The inner ring is press-fit onto the cylindrical portion of the wheel hub. The wheel hub and the inner ring are formed on their outer circumferences with double row inner raceway surfaces that oppose the double row outer raceway surfaces. Double row rolling elements are rollably contained between the inner and outer raceway surfaces. Seals are mounted in annular openings formed between the outer member and the inner member. A sensor holder includes an annular cover press-fit onto the outer circumference of an inner side end portion of the outer member. A holding portion is joined to the cover and is made of synthetic resin including a wheel speed sensor. A pulser ring is arranged on the outer circumference of the inner ring. The pulser ring has alternately and equidistantly varying circumferential characteristics. The pulser ring is arranged opposite to the wheel speed sensor, via a predetermined axial gap. The cover includes a cylindrical fitting portion adapted to be press-fit onto the inner side end portion of the outer member. A flange portion extends radially inward from the fitting portion. The flange portion is adapted to be in close contact with the end face of the outer member. A bottom portion extends further radially inward from the flange portion. The holding portion is integrally joined to the bottom portion. The flange portion is formed with a flat surface so that it forms an abutting width larger than 5 mm or more, against the end face of the outer member, or larger than 50% or more, relative to the flat width of the end face of the outer member. Thus, it is possible to provide a wheel bearing apparatus incorporating a wheel speed detecting apparatus that can improve the positioning accuracy of the cover by achieving close contact between the cover and the outer member. This prevents the cover from being press-fit obliquely or incorrectly onto the outer member. Accordingly, this improves the assembling accuracy of the sensor holder as well as the detection accuracy.

A wheel bearing apparatus incorporating a wheel speed detecting apparatus comprises an outer member formed with a body mounting flange on its outer circumference. The body mounting flange is to be mounted on a suspension apparatus of a vehicle. The outer member inner circumference includes double row outer raceway surfaces. An inner member includes a wheel hub and at least one inner ring. The wheel hub is integrally formed with a wheel mounting flange on one end. A cylindrical portion axially extends from the wheel mounting flange. The inner ring is press-fit onto the cylindrical portion of the wheel hub. The wheel hub and the inner ring are formed on their outer circumferences with double row inner raceway surfaces that oppose the double row outer raceway surfaces. Double row rolling elements are rollably contained between the inner and outer raceway surfaces. Seals are mounted in annular openings formed between the outer member and the inner member. A sensor holder includes an annular cover press-fit onto the outer circumference of an inner side end portion of the outer member. A holding portion is joined to the cover and is made of synthetic resin including a wheel speed sensor. An inner side seal of the seals includes an annular sealing plate with a metal core press-formed from a steel plate with a substantially L shaped cross-section. The plate is adapted to be fit onto the inner side end of the outer member. A sealing member is integrally joined to the metal core. A slinger is press-formed from a steel plate with a substantially L shaped cross-section. The slinger is adapted to be fit onto the outer circumference of the inner ring. A magnetic encoder is joined to the inner side surface of the slinger. The circumferential characteristics of the magnetic encoder alternately and equidistantly vary. The magnetic encoder is arranged opposite to the wheel speed sensor via a predetermined axial gap. The cover includes a cylindrical fitting portion adapted to be press-fit onto the inner side end portion of the outer member. A flange portion extends radially inward from the fitting portion. The flange portion is adapted to be in close contact with the end face of the outer member. A bottom portion extends further radially inward from the flange portion. A securing portion is formed on the bottom portion of the cover. The securing portion projects from the bottom portion toward the inner side at a radially outer portion of the bottom portion. The holding portion is arranged over a region beyond the outer circumference of the securing portion to the fitting portion. The flange portion is formed with a flat surface so that it forms an abutting width larger than 5 mm or more, against the end face of the outer member, or larger than 50% or more, relative to the flat width of the end face of the outer member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal-section view of a first embodiment of a wheel bearing apparatus incorporating a wheel speed detecting apparatus.

FIG. 2 is a partially enlarged view of FIG. 1 of the detecting portion.

FIG. 3 is a partially enlarged view FIG. 2.

FIG. 4 is a side elevation view of FIG. 1.

FIG. 5 is a longitudinal-section view of a second embodiment of a wheel bearing apparatus incorporating a wheel speed detecting apparatus.

FIG. 6 is a partially enlarged view of FIG. 5 of the detecting portion.

FIG. 7 is a side elevation view of the wheel bearing apparatus before mounting of the sensor holder.

FIG. 8 is a side elevation view of FIG. 5.

FIG. 9 is a front elevation view of a modification of FIG. 7 of the wheel bearing apparatus before mounting of the sensor holder.

FIG. 10 is a front elevation view of FIG. 9 of the wheel bearing apparatus after mounting of the sensor holder.

FIG. 11(a) is a partially enlarged view of an assembled condition of FIG. 10.

FIG. 11(b) is a partially enlarged view of a modification of FIG. 11(a).

FIG. 12 is a longitudinal-section view of a third embodiment of a wheel bearing apparatus incorporating a wheel speed detecting apparatus.

FIG. 13 is an explanatory view of a structure of the sensor holder of FIG. 12.

FIG. 14 is a longitudinal-section view of a fourth embodiment of a wheel bearing apparatus incorporating a wheel speed detecting apparatus.

FIG. 15 is a partially enlarged view of FIG. 14.

FIG. 16 is a longitudinal-section view of a fifth embodiment of a wheel bearing apparatus incorporating a wheel speed detecting apparatus.

FIG. 17 is a partially enlarged view of FIG. 16.

FIG. 18 is a longitudinal-section view of a sixth embodiment of a wheel bearing apparatus incorporating a wheel speed detecting apparatus.

FIG. 19 is a partially enlarged view of FIG. 18 of the detecting portion.

FIG. 20 is an explanatory view of a structure of the sensor holder of FIG. 19.

FIG. 21 is a side elevation view of FIG. 18.

FIG. 22(a) is a longitudinal cross-section view of a cover.

FIG. 22(b) is a front elevation view of a cover.

FIG. 23 is a longitudinal-section view of a seventh embodiment of a wheel bearing apparatus incorporating a wheel speed detecting apparatus.

FIG. 24 is a partially enlarged view of FIG. 23 of the detecting portion.

FIG. 25 is a view taken from an arrow III-III.

FIG. 26 is a partially cross-sectional view taken along a line VI-VI of FIG. 25.

FIG. 27 is a partially cross-sectional view of the modification of FIG. 26.

FIG. 28 is a longitudinal-section view of a prior art wheel bearing apparatus incorporating a wheel speed detecting apparatus.

FIG. 29 is a partially enlarged view of FIG. 28.

FIG. 30 is a side elevation view of FIG. 28.

DETAILED DESCRIPTION

A first embodiment of the present disclosure will be described with reference to accompanied drawings.

FIG. 1 is a longitudinal-section view of a first embodiment of a wheel bearing apparatus incorporating a wheel speed detecting apparatus. FIG. 2 is a partially enlarged view of FIG. 1 showing the detecting portion. FIG. 3 is a partially enlarged view of FIG. 2. FIG. 4 is a side elevation view of FIG. 1. In the description below, an outer side of a bearing apparatus, when it is mounted on a vehicle, is referred to as the "outer side" (the left side in a drawing). The inner side of a bearing apparatus, when it is mounted on a vehicle, is referred to as "inner side" (the right side in a drawing).

The wheel bearing apparatus incorporating a wheel speed detecting apparatus has a structure of a so-called "third generation". It includes an inner member 3 including a wheel hub 1 and an inner ring 2, and an outer member 5. The outer member 5 is fit onto the inner member 3 via double row rolling elements (balls) 4, 4. The inner member 3 is connected to a constant velocity universal joint 13.

The wheel hub 1 is integrally formed with a wheel mounting flange 6 to mount a wheel (not shown) at its outer side end. Hub bolts 6a are secured on the flange 6 at circumferentially equidistant positions. The outer circumferential surface of the wheel hub 1 is formed with one (outer side) inner raceway surface 1a. A cylindrical portion 1b extends axially from the inner raceway surface 1a. The inner circumference of the wheel hub 1 is formed with a serration (or spline) 1c for torque transmission. The inner ring 2 is press-fit onto the cylindrical portion 1b, via a predetermined interference. The inner ring outer circumference includes an inner side (the other) inner raceway surface 2a.

The wheel hub 1 is made of medium high carbon steel such as S53C including carbon of 0.40-0.80% by weight. It is formed with a hardened layer having a surface hardness 58-64 HRC. The hardened layer is formed by high frequency induction hardening in a region from an inner side base 6b of the wheel mounting flange 6, forming a seal land portion of a seal 8, to the cylindrical portion 1b via the inner raceway surface 1a. Thus, it is possible not only to improve the wear resistance of the base portion 6b but to suppress the fretting of the cylindrical portion 1b forming a fitting surface with the inner ring 2. Thus, this provides sufficient mechanical strength against the rotary bending load applied to the wheel mounting flange 6 and, accordingly, the durability of the wheel hub 1. The inner ring 2 and the rolling elements 4 are made of high carbon chrome steel such as SUJ2. They hardened to their core by dip quenching to have a surface hardness of 58-64 HRC.

The outer member 5 is made of medium/high carbon steel including carbon of 0.40-0.80% by weight such as S53C. It is formed on its outer circumference with a body mounting flange 5b, to be mounted on a knuckle KN, and on its inner circumference with double row outer raceway surfaces 5a, 5a. The outer raceway surfaces 5a, 5a correspond to the double row inner raceway surfaces 1a, 2a of the inner member 3. The double row outer raceway surfaces 5a, 5a are hardened by high frequency induction quenching to have a surface hardness of 58-64 HRC. The double row rolling elements 4, 4 are contained between the outer raceway surfaces 5a, 5a of the outer member 5 and the oppositely arranged inner raceway surfaces 1a, 2a. The rolling elements 4, 4 are rollably held by cages 7, 7. Seals 8, 9 are arranged in annular spaces formed between the outer member 5 and the inner member 3. The seals 8, 9 prevent leakage of grease contained within the bearing as well as entry of rainwater or dusts into the bearing.

The constant velocity universal joint 13 includes an outer joint member 22, a joint inner ring, a cage and torque transmitting balls (not shown). The outer joint member 22 has an integrally formed shaft portion 24 that axially extends from the shoulder 23. The shaft portion 24 is formed, on its outer circumference, with a serration (or spline) 24a to engage the serration 1c of the wheel hub 1. An outer (male) thread 24b is on the end of the serration 24a. The outer joint member 22 is inserted into the wheel hub 1 via the serrations 1c, 24a until the end face of the inner ring 2 abuts against the shoulder 23 of the outer joint member 22. Accordingly, the wheel hub 1 and the outer joint member 22 can be torque transmittably and detachably united by a securing nut 25 fastened to the outer thread 24b.

In this embodiment, a sensor holder 10 is mounted on the inner side end of the outer member 5. The sensor holder 10 includes a cup shaped cover 11 and a holding portion 12 joined to the cover 11. As shown in an enlarged view of FIG. 2, the cover 11 is formed with a generally annular configuration. It has a cylindrical fitting portion 11a press-fit onto the outer circumference of the inner side end of the outer member 5. A flange portion 11b extends radially inward from the fitting portion 11a. The flange portion 11b is adapted to be in close contact with the end face 5c of the outer member 5. A bottom portion 11c extends further radially inward from the flange portion 11b.

According to this structure, since the fitting portion 11a is fit onto the inner side end portion of the outer member 5 under a condition where the flange portion 11b is in close contact with the end face 5c of the outer member 5, it is possible to easily and exactly position the sensor holder 10 relative to the outer member 5. Thus, this exactly detects the wheel speed. The cover 11 is press-formed from preserved non-magnetic steel sheet such as stainless steel sheet, austenitic stainless steel sheet (JIS SUS 304 etc.). Thus, it is possible to provide a wheel bearing apparatus incorporating a wheel speed detecting apparatus that does not give any adverse influence to the detecting performance of the wheel speed sensor 14 as described later. Also, it can maintain the reliability for a long term while suppressing the generation of corrosion on the cover 11.

According to this embodiment, a securing portion 20 is formed on a radially outward circumferential portion, a circumferential portion at a side away from the ground, of the bottom portion 11c of the cover 11. Thus, it projects toward the inner side. More particularly, as shown in FIG. 4, the holding portion 12 is integrally joined to the securing portion 20. The securing portion 20 is arranged so that it is positioned within a range of inclination angle $\theta$ of 30-90° from a line vertical to the ground. A notch 20a is formed in the securing portion 20. The holding portion 12 extends into the notch 20a and integrally formed with the securing portion 20 over a region beyond the circumference of the securing portion 20 to the fitting portion 11a. A harness 21 extends from the holding portion 12 tangentially to the cover 11. The harness 21 is connected to the wheel speed sensor 14. Such a structure enables the harness 21 to be easily taken out, radially outward, from the knuckle KN and thus improves the workability during assembly.

If the inclination angle $\theta$ is less than 30°, the harness 21 would be excessively bent relative to the holding portion 12 in order to take out the harness 21 radially outward from the knuckle KN. This would cause adverse influence to the internal wiring in the holding portion 12 and is undesirable. On the other hand if the inclination angle exceeds 90°, the length of the harness 21 would be unnecessarily extended. Thus, the assembling operation is complicated. Thus, not only the workability is detracted but also the harness 21 tends to interfere with the knuckle KN and other surrounding parts of a vehicle.

In addition an elongated draining aperture 26 is formed in the bottom portion 11c of the cover 11 at a position nearest to the ground. Thus, foreign matter, such as muddy water or debris, that may enter into the bottom portion 11c of the cover 11 during running of a vehicle can easily be discharged and do not stay in the apparatus for a long term. Thus, it is possible to prevent surrounding parts of the vehicle from being damaged by solidified foreign matter.

The holding portion 12 is injection molded from non-magnetic special ether family resin material, such as polyphenylene sulfide (PPS). It includes 10-45 wt % of fiber reinforcing material of GF (glass fiber). Thus, it is possible to provide a wheel bearing apparatus with improved corrosion resistance, strength and durability without giving any adverse influence to the detecting performance of the wheel speed sensor 14. The inclusion of GF as reinforcing fiber makes it possible to use semicrystalline material at a temperature exceeding its glass transition temperature. Thus, this improves the heat resistance. The rigidity of the holding portion 12 can also be increased due to an increase in the elasticity modulus.

As to the amount of GF to be included in the plastic resin, sufficient effect cannot be expected if it is less than 10 wt %. On the other hand, if the amount of GF exceeds 45 wt % the fibers in the molded article would cause anisotropy and thus increase the density and detract from the dimensional stability. The holding portion 12 may be formed by injectable synthetic resins such as polyamide (PA) 66, PA6-12, polybutylene terephthalate (PBT) etc. other than PPS. The fiber reinforcing material is not limited to GF and for example carbon fiber (CF), aramid fiber or boron fiber may be used.

The wheel speed sensor 14 is embedded in the holding portion 12 so that it is arranged opposite to a magnetic encoder 16, described later, via a predetermined axial gap (air gap). The wheel speed sensor 14 includes a magnetic detecting element such as a Hall effect element, magnetic resistance element (MR element) etc. to change its characteristics in accordance with the flow direction of magnetic flux. An IC incorporating a wave forming circuit to rectify the output wave form of the magnetic detecting element is included. This detects the wheel speed with a high reliability and at a low cost. The holding portion 12 may be formed by injectable synthetic resins such as polyamide (PA) 66, polyphthalamide (PPA), polybutylene terephthalate (PBT) etc. other than materials mentioned above. The holding portion 12 may be integrally joined to the securing portion 20 of the cover 11 by insert molding.

As shown in FIG. 2, a slinger 15 is press-fit onto the inner ring 2 so that it axially opposes the holding portion 12. The slinger 15 forms part of the inner side seal 9. The slinger 15 includes a cylindrical portion 15a press-fit onto the inner ring 2. A standing portion 15b extends radially outward from the cylindrical portion 15a. The slinger 15 is press-formed from a ferromagnetic steel plate such as ferritic stainless steel sheet (JIS SUS 430 etc.) or preserved cold rolled sheet (JIS SPCC etc.), with a substantially L shaped cross-section. The magnetic encoder 16 is an elastomer such as rubber mingled with magnetic powder, such as ferrite. The magnetic encoder 16 is integrally joined, via vulcanized adhesion, to the inner side surface of the standing portion 15b of the slinger 15. The magnetic encoder 16 constructs a rotary encoder to detect the wheel speed having N and S poles alternately arranged along its circumference.

The inner side seal 9 is formed of a so-called "pack seal" including the slinger 15, and an annular sealing plate 17. The sealing plate 17 has a substantially L shaped cross-section. The sealing plate 17 is adapted to be mounted on the outer member 5 opposite to the slinger 15. The sealing plate 17 includes a metal core 18 fit into the inner side end of the outer member 5. A sealing member 19 is adhered to the metal core 18, via vulcanized adhesion. The metal core 18 is press-formed from a ferritic stainless steel sheet (JIS SUS 430 etc.) or preserved cold rolled sheet (JIS SPCC etc.) with a substantially L shaped cross-section.

The sealing member 19 is formed from an elastic member such as synthetic rubber. The sealing member 19 includes a side lip 19a that slidingly contacts the standing portion 15b. A grease lip 19b and a middle lip 19c slidingly contact the cylindrical portion 15a. The outer circumferential edge of the standing portion 15b of the slinger 15 is arranged opposite to the metal core 18 via a slight radial gap to form a labyrinth seal.

According to this embodiment, the flange portion 11b of the cover 11 is formed with a flat surface so that it has an abutting width β of 5 mm or more against the end face 5c of the outer member 5. If the abutting width β of 5 mm cannot be assured, it is set so that an abutting width β is of 50% or more of the flange portion 11b and can be obtained relative to a flat width α of the end face 5c (β/α≧0.5). This makes it possible to provide a wheel bearing apparatus incorporating a wheel speed detecting apparatus that can improve the positioning accuracy of the cover by achieving close contact between the cover and the outer member. This prevents the cover from being press-fit obliquely or incorrectly onto the outer member. Accordingly, this improves the assembling accuracy of the sensor holder as well as the detection accuracy.

If such a setting value cannot be assured, a substantially equal effect can be obtained by modifying a thickness and dimensions of chamfered portions of the cover 11. As opposed to the sensor holder of the prior art where the bottom portion is formed as axially projecting from the flange portion of the cover and the holding portion is joined to the inside of the bottom portion, according to the present embodiment, the bottom portion 11c is formed extending radially inward from the flange portion 11b of the cover 11, the securing portion 20 is formed projecting toward the inner side from the bottom portion 11c, and the holding portion 12 is arranged beyond the outer circumference of the securing portion 20 to the fitting portion 11a. Accordingly, this makes it possible to easily increase the flat surface by further extending the flange portion 11b radially inward while keeping the space for the holding portion 12.

Although it is shown in this embodiment as an active type wheel speed detecting apparatus including the magnetic encoder 16 and the wheel speed sensor 14 including magnetic detecting elements such as Hall effect elements, it is possible to use a passive type wheel speed detecting apparatus including gears, a magnet, and an annular coil etc.

FIG. 5 is a longitudinal-section view of a second embodiment of a wheel bearing apparatus incorporating a wheel speed detecting apparatus. FIG. 6 is a partially enlarged view of FIG. 5 showing the detecting portion. FIG. 7 is a side elevation view of the wheel bearing apparatus before mounting of the sensor holder. FIG. 8 is a side elevation view of FIG. 5. FIG. 9 is a front elevation view of a modification of FIG. 7 the wheel bearing apparatus before mounting of the sensor holder. FIG. 10 is a front elevation view of FIG. 9 of the wheel bearing apparatus after mounting of the sensor holder. FIG. 11(a) is a partially enlarged view of an assembled condition of FIG. 10. FIG. 11(b) is a partially enlarged view of a modification of FIG. 11(a).

The second embodiment is basically the same as the first embodiment only differing in the structure of the sensor holder. Accordingly, the same reference numerals are used in this embodiment to designate the same portions, same parts or same functions as those in the first embodiment.

This wheel bearing apparatus has a structure of a so-called "third generation". It includes an inner member 3, including a wheel hub 1 and an inner ring 2, and an outer member 5. The outer member 5 is fit onto the inner member 3 via double row rolling elements (balls) 4, 4.

In this embodiment, a sensor holder 27 is mounted on the inner side end of the outer member 5. This sensor holder 27 includes a cup shaped cover 28 and a holding portion 29 joined to the cover 28. The cover 28 is press-formed from a preserved non-magnetic steel sheet such as stainless steel sheet, austenitic stainless steel sheet (JIS SUS 304 etc.). Thus, it is possible to provide a wheel bearing apparatus incorporating a wheel speed detecting apparatus that does not give any adverse influence to the detecting performance of the wheel speed sensor 14. Accordingly, it can maintain the reliability for a long term while suppressing the generation of corrosion on the cover 28.

The cover 28 is formed with a generally annular configuration. It includes a cylindrical fitting portion 28a, a flange portion 28b and a bottom portion 28c. The cylindrical fitting portion 28a is press-fit onto the outer circumference of the inner side end of the outer member 5. The flange portion 28b extends radially inward from the fitting portion 28a. The flange portion 28b is adapted to be in close contact with the end face 5c of the outer member 5. A bottom portion 28c extends further radially inward from the flange portion 28b. According to this structure, since the cover 28 is fit onto the inner side end portion of the outer member 5 under a condition where the flange portion 28b is in close contact with the end face 5c of the outer member 5, it is possible to easily and exactly position the sensor holder 27 relative to the outer member 5 and thus to exactly detect the wheel speed.

A securing portion 30 is formed on a radially outward circumferential portion, a circumferential portion at a side away from the ground, of the bottom portion 28c of the cover 28. Thus, it projects toward the inner side. More particularly, as shown in FIG. 8, the securing portion 30 is arranged so that it is positioned within a range of an inclination angle θ of 30-90° from a line vertical to the ground. A notch 30a is formed in the securing portion 30. The holding portion 29 extends into the notch 30a and is integrally formed with it. A harness 21 extends from the holding portion 29 tangentially to the cover 28. The harness 21 is connected to the wheel speed sensor 14. Such a structure enables the harness 21 to be easily taken out, radially outward, of the knuckle KN and thus improves the workability during assembly. The holding portion 29 may be integrally joined by insert molding the securing portion 30 with the cover 28.

If the inclination angle θ is less than 30°, the harness 21 would have to be excessively bent relative to the holding portion 29 in order to take out the harness 21, radially outward, from the knuckle KN. This would cause adverse influence onto the internal wiring in the holding portion 29 that is undesirable. On the other hand if the inclination angle θ exceeds 90°, the length of the harness 21 would be unnecessarily extended and thus the assembling operation is complicated. Thus, not only the workability is detracted but also the harness 21 tends to interfere with the knuckle KN and other surrounding parts of a vehicle.

In addition an elongated draining aperture 26 is formed in the bottom portion 28c of the cover 28 at a position nearest to the ground. Thus, foreign matter, such as muddy water or debris, that enters in the bottom portion 28c of the cover 28 during running of the vehicle can be easily discharged and does not stay there for a long term. Thus, it is possible to prevent surrounding parts of the vehicle from being damaged by solidified foreign matter.

The wheel speed sensor 14 is embedded in the holding portion 29. The holding portion 29 is injection molded from non-magnetic special ether family resin material such as polyphenylene sulfide (PPS) included therein fiber reinforcing material such as GF. Thus, it is possible to provide a wheel bearing apparatus with improved corrosion resistance, strength and durability without giving any adverse influence onto the detecting performance of the wheel speed sensor 14. The holding portion 29 may be formed by injectable synthetic resins such as PA 66, PPA, PBT etc. other than materials mentioned above.

In this embodiment, a predetermined mark 31 is formed on the inner side end face 5c of the outer member 5 as shown in FIG. 7. The mark 31 is formed by a laser marking method as a dot at a phase corresponding to the holding portion 29 of the sensor holder 27. The mark 31 may be formed by painting.

A second mark 32 is formed by painting at a predetermined position on the side surface of the holding portion 29 of the sensor holder 27. This mark 32 is formed as a dot at a position corresponding to the wheel speed sensor 14. The sensor holder 27 can be mounted on the outer member 5 by aligning the mark 31 of the outer member 5 and the mark 32 of the holding portion 29 with each other during the assembling step of the sensor holder 27. This makes it possible to exactly mount the sensor holder 27 on the outer member 5 while watching each mark. This improves the workability during assembly of the bearing apparatus. Thus, this provides a wheel bearing apparatus incorporating a wheel speed detecting apparatus with an improved reliability. The mark 32 of the sensor holder 27 may be formed by indenting simultaneously with the formation of the holding portion 29.

FIG. 9 shows a modification of previously described assembling method. In this modification a mark 33 is formed on the outer circumference of the inner side end of the outer member 5. This mark 33 is formed by laser marking as a band at a phase corresponding to the holding portion 29 of the sensor holder 27.

FIG. 10 illustrates a mark 34 is formed on the outer circumference of the fitting portion 28a of the cover 28 of the sensor holder 27. This mark 34 is formed as a band at a position corresponding to the wheel speed sensor 14. The sensor holder 27 can be fit onto the outer member 5 by aligning the mark 33 of the outer member 5 and the mark 34 of the cover 28 with each other as shown in FIG. 11(a). This makes it possible to exactly mount the sensor holder 27 on the outer member 5 while watching the marks 33, 34. This further improves the positioning accuracy of the sensor holder 27 relative to the outer member 5 and the workability during assembly of the bearing apparatus.

The marking may include another modification as shown in FIG. 11(b). In this modification, the mark 33 is formed on the outer circumference of the inner side end of the outer member 5. A mark 35, of dotted configuration, is formed on the outer circumference of the holding portion 29 of the sensor holder 27. The sensor holder 27 can be mounted on the outer member 5 by aligning these marks 33, 35 with each other.

FIG. 12 is a longitudinal-section view of a third embodiment of a wheel bearing apparatus incorporating a wheel speed detecting apparatus. FIG. 13 is an explanatory view of a structure of the sensor holder of FIG. 12. The third embodiment is basically the same as the second embodiment only different in the structure of the wheel speed sensor. Accordingly, the same reference numerals are used in this embodiment to designate the same portions, same parts or same functions as those in the previous embodiments.

In this embodiment, the sensor holder 27 is mounted on the inner side end of the outer member 5. This sensor holder 27 includes the cup shaped cover 28 and the holding portion 29 joined to the cover 28.

A wheel speed sensor 36 shown in FIG. 12 is arranged opposite to a magnetic encoder 16, via a predetermined axial gap (air gap). The speed sensor 36 includes a magnetic detecting element to vary its characteristics in accordance with the flow direction of magnetic flux, such as a Hall effect element or magnetic resistance element (MR element) etc., an IC 36a, and a lead wire 36b. The IC 36a incorporates a wave forming circuit to rectify the output wave form of magnetic detecting element. The output of the wheel speed sensor 36 is sent to a controller of an ABS (not shown), via the harness 21. This detects the wheel speed with a high reliability and at a low cost to reduce the size of the bearing apparatus.

In this embodiment, several portions of the holding portion 29 of the sensor holder 27 are limited to predetermined dimensions. As shown in FIG. 13, the axial dimension G of the holding portion 29 is defined as G=A+B+C+D+E+F. A is a molding thickness between the detecting surface (outer side end face) of the holding portion 29 and the IC 36a. B is a thickness of the IC 36a. C is a distance between the IC 36a and the center of the harness 21. D is a radius of the harness 21. E is a molding thickness between the harness 21 and the inner side end face of the holding portion 29. F is a distance between the abutting surface of the flange portion 28b of the cover 28 with the end face 5c of the outer member 5 and the detecting surface of the holding portion 29.

In order to prevent the holding portion 29 from being damaged by a pulling force applied to the harness 21, it is necessary to assure the axial molding thickness of a portion where the harness 21 is positioned to at least of E=1.0 mm and C=3.0 mm. Also, in order to prevent the IC 36a from being damaged by foreign matter entering between the inner side surface of the magnetic encoder 16 and the detecting surface of the holding portion 29, it is necessary to assure the axial molding thickness of a portion where the IC 36a is positioned to at least of A=0.5 mm. When assuming that the thickness B of a generally used IC 36a is 1.6 mm, the radius D of the harness 21 is 2.0 mm, and the dimension F is 0.4 mm in consideration of the necessary air gap and positioning error slinger 15, the minimum amount of axial projection G of the holding portion 29 from the end face 5c of the outer member 5 is expressed as: G=A+B+C+D+E+F=0.5+1.6+3.0+2.0+1.0+0.4=8.5 mm. In consideration of interference of the holding portion 29 with surrounding parts (e.g. constant velocity universal joint, not shown), it is preferable that the amount of axial projection of the holding portion 29 is 20 mm or less.

The radial dimension N of the holding portion 29 is defined as N=H+J+K+L+M. H is a molding thickness between the outer circumference of the holding portion 29 and the harness 21. J is a distance between the outer circumference of the harness 21 and the lead wires 36b. K is a distance between a bent portion of the lead wires 36b and the IC 36a. L is a radial width of the IC 36a. M is a molding thickness between the IC 36a and the inner circumference of the holding portion 29.

In order to prevent the holding portion 29 from being damaged by a pulling force applied onto the harness 21, it is necessary to assure the radial molding thickness of a portion where the harness 21 is positioned to at least of H=1.0 mm and M=1.0 mm. From the actual dimension of a generally used wheel speed sensor 36, it is assume that J is 1.5 mm, K is 1.5 mm, L is 3.5 mm, and M is 1.0 mm. Thus, the minimum radial dimension N of the holding portion is expressed as: N=H+J+K+L+M=1.0+1.5+1.5+3.5+1.0=8.5 mm. In consideration of interference of the holding portion 29 with surrounding parts (e.g. constant velocity universal joint, not shown), it is preferable that the radial dimension N of the holding portion 29 is 15 mm or less.

Accordingly, it is possible to optimize the dimensions of the sensor holder 27 by calculating the dimensions of the holding portion 29 of the sensor holder 27 and selling them at optimized values. Thus, this provides a wheel bearing apparatus incorporating a wheel speed detecting apparatus that can improve the strength and rigidity of the holding portion 29 and prevent interference of the holding portion 29 with surrounding parts. Thus, this improves the reliability of the wheel bearing apparatus.

FIG. 14 is a longitudinal-section view of a fourth embodiment of a wheel bearing apparatus incorporating a wheel speed detecting apparatus. FIG. 15 is a partially enlarged view FIG. 14. This embodiment is basically the same as the second embodiment only differing in the structure of the sensor holder. Accordingly, the same reference numerals are used in this embodiment to designate the same portions, same parts or same functions as those in the previous embodiments.

In this embodiment, a sensor holder 37 is mounted on the inner side end of the outer member 5. This sensor holder 37 includes the cup shaped cover 38 and the holding portion 39 joined to the cover 38. The cover 38 is press-formed from preserved non-magnetic steel sheet such as stainless steel sheet, austenitic stainless steel sheet (JIS SUS 304 etc.). Thus, it is possible to provide a wheel bearing apparatus incorporating a wheel speed detecting apparatus that does not give any adverse influence to the detecting performance of the wheel speed sensor 14. Accordingly, it can maintain reliability for a long term while suppressing the generation of corrosion on the cover 38.

The cover 38 is formed with a generally annular configuration. It includes the cylindrical fitting portion 11a press-fit onto the outer circumference of the inner side end of the outer member 5. The flange portion 11b extends radially inward from the fitting portion 11a. The flange portion 11b is adapted to be in close contact with the end face 5c of the outer member 5. The bottom portion 38a extends further radially inward from the flange portion 11b. According to this structure, since the cover 38 is fit onto the inner side end portion of the outer member 5 under a condition where the flange portion 11b is in close contact with the end face 5c of the outer member 5, it is possible to easily and exactly position the sensor holder 37 relative to the outer member 5 and thus to exactly detect the wheel speed.

The securing portion 20 is formed on a radially outward circumferential portion, a circumferential portion at a side away from the ground, of the bottom portion 38a of the cover 38. Thus, it projects toward the inner side. A circular aperture 20b is formed in the securing portion 20. The holding portion 39 of synthetic resin can be integrally joined to the cover 38 by insert molding. This strongly secures the holding portion 39 to the cover 38. Accordingly, it is possible to assure close contact of the holding portion 39 with the cover 38 even though the bearing apparatus is used under severe conditions, such as repeating variation of high and low temperature. Thus, this prevents separation of the insert molded holding portion 39 from the cover 38.

The wheel speed sensor 14 is embedded in the holding portion 39. The holding portion 39 is injection molded from non-magnetic special ether family resin material such as polyphenylene sulfide (PPS) including fiber reinforcing material such as GF. Thus, it is possible to provide a wheel bearing apparatus with improved corrosion resistance, strength and durability without giving any adverse influence to the detecting performance of the wheel speed sensor 14. The holding portion 39 may be formed by injectable synthetic resins such as PA 66, PPA, PBT etc. other than materials mentioned above.

In this embodiment, the slinger 15 is positioned and secured so that the inner side surface of the magnetic encoder 16 is positioned in the same plane as that of the end face of the inner ring 2 or in a position slightly retracted therefrom toward the inner side of the bearing apparatus (outer side of the vehicle). The outer side surface of the holding portion 39 is arranged so that it does not project from the inner surface of the bottom portion 38a of the cover 38. Thus, it is possible to prevent surfaces of the magnetic encoder 16 or the holding portion 39 from being damaged by foreign matter, such as muddy water or debris, blown off by a centrifugal force. Thus, it is possible to stably and exactly maintain, for a long term, the gap between the magnetic encoder 16 and the detecting portion of the wheel speed sensor 14. This improves the reliability of the wheel speed detection.

A distance L1 between the inner side surface of the bottom portion 38a of the cover 38 and the magnetic encoder 16 is set within 3 mm to assure a desirable air gap and to prevent direct entry of muddy water, etc. The distance δ between the outer side surface of the holding portion 39 and the inner side surface of the bottom portion 38a is set within 0-0.1 mm. If the distance δ exceeds 0.1 mm, the air gap between the magnetic encoder 16 and the magnetic detecting element (detecting portion) of the wheel speed sensor 14 becomes too large. Thus, the flux density is reduced and the detecting accuracy is detracted.

FIG. 16 is a longitudinal-section view of a fifth embodiment of a wheel bearing apparatus incorporating a wheel speed detecting apparatus. FIG. 17 is a partially enlarged view FIG. 16. This embodiment is basically the same as the fourth embodiment only differing in the structure of the sensor holder. Accordingly, the same reference numerals are used in this embodiment to designate the same portions, same parts or same functions as those in the previous embodiments.

This wheel bearing apparatus has a structure of a so-called "third generation". It includes an inner member 3, including a wheel hub 1 and an inner ring 2, and an outer member 5. The outer member 5 is fit onto the inner member 3, via double row rolling elements (balls) 4, 4. The inner member 3 is connected to a constant velocity universal joint 13.

In this embodiment, a sensor holder 40 is mounted on the inner side end of the outer member 5. This sensor holder 40 includes a cup shaped cover 41 and a holding portion 42 joined to the cover 41. As shown in the enlarge view of FIG. 17, the cover 41 has the cylindrical fitting portion 11a press-fit onto the outer circumference of the inner side end of the outer member 5. The flange portion 11b extends radially inward from the fitting portion 11a. The flange portion 11b is adapted to be in close contact with the end face 5c of the outer member 5. A securing portion 41a extends further radially inward from the flange portion 11b. The cover 41 is press-formed from a preserved non-magnetic steel sheet such as stainless steel sheet, austenitic stainless steel sheet (JIS SUS 304 etc.).

A plurality of circular apertures 20b is formed in the securing portion 41a of the cover 41. The plurality is along the periphery of the securing portion 41a so that the synthetic resin holding portion 42 can be integrally joined to the cover 41 by insert molding. The wheel speed sensor 14 is embedded in the holding portion 42 at a radially outer position. Thus, the sensor 14 axially opposes the magnetic encoder 16. Accordingly, it is possible to assure the close contact of the holding portion 42 with the cover 41 even though the bearing apparatus is used under severe conditions. Thus, this prevents separation of the insert molded holding portion 42 from the cover 41. The holding portion 42 is injection molded from non-magnetic special ether family resin material such as polyphenylene sulfide (PPS) including fiber reinforcing material such as GF.

In this embodiment, the holding portion 42 is formed as a generally annular configuration with a substantially rectangular cross-section. An inner circumferential surface 42a of the holding portion 42 opposes the shoulder 23 of the outer joint member 22, via a slight radial gap, to form a labyrinth seal γ. This improves the sealability of the detecting portion. Thus, this prevents entry of muddy water and debris into the bearing apparatus and improves its reliability for a long term.

In addition, a distance L2 is between the outer side surface of the holding portion 42, forming the detecting portion of the wheel speed sensor 14 and the inner side surface of the magnetic encoder 16. The distance L2 is set within 3 mm to assure a desirable air gap. This prevents direct entry of muddy water or debris into the inner side seal 9. The radial gap, between the holding portion 42 and the shoulder 23 of the outer joint member 22, is preferably set within 0.5-3.0 mm. This prevents interference and assures the sealability of the detecting portion.

FIG. 18 is a longitudinal-section view of a sixth embodiment of a wheel bearing apparatus incorporating a wheel speed detecting apparatus. FIG. 19 is a partially enlarged view of FIG. 18 showing the detecting portion. FIG. 20 is an explanatory view of a structure of the sensor holder of FIG. 19. FIG. 21 is a side elevation view of FIG. 18. FIG. 22(*a*) is a longitudinal cross-section view of a cover. FIG. 22(*b*) is a front elevation view, respectively, of a cover. This embodiment is basically the same as the previous embodiments only differing in the structure of the sensor holder. Accordingly, the same reference numerals are used in this embodiment to designate the same portions, same parts or same functions as those in the previous embodiments.

In this embodiment, a sensor holder 43 is mounted on the inner side end of the outer member 5. The sensor holder 43 includes the cup shaped cover 44 and a holding portion 45 joined to the cover 44. The cover 44 is press-formed from preserved non-magnetic steel sheet such as stainless steel sheet, austenitic stainless steel sheet (JIS SUS 304 etc.). This makes it possible to maintain reliability for a long term while suppressing the generation of corrosion on the cover 44 without giving any adverse influence onto the detecting performance of the wheel speed sensor 36.

As shown in FIG. 19, the cover 44 is formed with a generally annular configuration. The cover 44 includes a cylindrical fitting portion 44a press-fit onto the outer circumference of the inner side end of the outer member 5. A flange portion 44b extends radially inward from the fitting portion 44a. The flange portion 44b is adapted to be in close contact with the end face 5c of the outer member 5. A bottom portion 44c extends further radially inward from the flange portion 44b. The holding portion 45 is integrally molded in a region from the flange portion 44b to the bottom portion 44c, over its whole circumference. According to this structure, since the cover 44 is fit onto the inner side end portion of the outer member 5 under a condition where the flange portion 44b is in close contact with the end face 5c of the outer member 5, it is possible to easily and exactly position the sensor holder 43 relative to the outer member 5 and thus to exactly detect the wheel speed.

As shown in FIG. 22, a notch 20a is formed on a radially outward circumferential portion, a circumferential portion at a side away from the ground, of the bottom portion 44c of the cover 44. The wheel speed sensor 36 is embedded in the holding portion 45 in the notch 20a. In addition, a plurality of through apertures 46 is punched along the periphery of the bottom portion 44c. The molding synthetic resin forming the holding portion 45 flows into these apertures 46 to strongly secure the cover 44 without causing any separation between the two.

An elongated draining aperture 47 is formed on a radially outward circumferential portion, a circumferential portion at a side nearest to the ground, of the bottom portion 44c of the cover 44. Thus, foreign matter such as muddy water or debris that enters into the bottom portion 44c of the cover 44 during running of the vehicle can easily be discharged and does not stay there for a long term. Thus, this prevents surrounding parts of the vehicle from being damaged by solidified foreign matter.

The holding portion 45 is injection molded from non-magnetic special ether family resin material such as polyphenylene sulfide (PPS) including therein 10-45 wt % of fiber reinforcing material such as GF. Thus, it is possible to provide a wheel bearing apparatus that improves corrosion resistance, strength and durability without giving any adverse influence onto the detecting performance of the wheel speed sensor 36. This makes it possible to use semicrystalline material at a temperature exceeding its glass transition temperature. Thus, this improves the heat resistance, the rigidity and the dimensional stability due to increase of the elasticity modulus.

As to the amount of GF to be included in the plastic resin, a sufficient effect cannot be expected if it is less than 10 wt %. On the other hand, if the amount of GF exceeds 45 wt % the fibers in the molded article would cause anisotropy and thus increase the density and detract from the dimensional stability. The holding portion 45 may be formed by injectable synthetic resins such as polyamide (PA) 66, PA6-12, polybutylene terephthalate (PBT) etc. other than PPS. The fiber reinforcing material is not limited to GF and for example carbon fiber (CF), aramid fiber or boron fiber may be used.

According to this embodiment, as shown in FIG. 19, a portion of the holding portion 45 where the wheel speed sensor 36 is embedded has a substantially rectangular cross-section. No parts relating to the wheel speed sensor 36, such as the IC 36a or lead wires 36b are arranged in the other portion of the holding portion 45 that is adapted to be pressed by a press-fitting tool during mounting of the sensor holder 43 on the outer member 5, i.e., a portion L in FIG. 19 defined between an outer diameter Dh of the holding portion 45 and an inner diameter Do of the end of the outer member 5. Thus, it is possible to prevent the parts relating to the wheel speed sensor 36 from being damaged even if the holding portion 45 is pressed by a press-fitting tool during its mounting operation.

In a portion other than the portion where the wheel speed sensor 36 is embedded, a thin walled inner circumferential portion 45a is molded on either side of the bottom portion 44c of the cover 44. A thick walled outer circumferential portion 45b is also molded radially outward from the inner circumferential portion 45a and axially projects from it. The holding portion 45 is formed so that it has an outer diameter Dh that is the same as the outer diameter of the fitting portion 44a of the cover 44 or slightly smaller. Thus, Dh≦Da+2t where "t" is a thickness of the cover 44. This maximizes the square of the holding portion 45 pressed by the press-fitting tool. Thus, this reduces stress caused in the holding portion 45 and prevents deformation and damage to the holding portion 45.

In addition the inner side surface of the holding portion 45 is formed so that it has a co-planar configuration over its entire circumference. This enables the press-fitting tool to press a pressing region W of the holding portion 45 substantially uniform over its entire circumference. Thus, this reduces the stress caused in the holding portion 45 and prevents deformation and damage to the holding portion 45. In addition, it is possible for the flange portion 44b of the cover 44 to be in close contact with the end face 5c of the outer member 5. Thus, this accurately sets the air gap between the magnetic encoder 16 and the wheel speed sensor 36 at a predetermined value to improve the sealability. Furthermore, since the securing force of the cover 44 can be assured, it is possible to surely prevent erroneous operations of an ABS due to axial and circumferential movements of the sensor holder 43 by vibrations or shocks caused during running of the vehicle. Thus, this improves the reliability that maintains a desirable detecting accuracy for a long term. The term "substantially co-planar" means a target value in design of configuration having no substantial step therein and thus a step caused by a machining error should be excepted.

FIG. 23 is a longitudinal-section view of a seventh embodiment of a wheel bearing apparatus incorporating a wheel speed detecting apparatus. FIG. 24 is a partially enlarged view of FIG. 23 of the detecting portion. FIG. 25 is a view taken from an arrow III-III. FIG. 26 is a partially cross-sectional view taken along a line VI-VI of FIG. 25. FIG. 27 is a partially cross-sectional view of a modification of FIG. 26. This embodiment is basically the same as the previous embodiments only differing in the structures of the inner side seal and the sensor holder. Accordingly, the same reference numerals are used in this embodiment to designate the same portions, same parts or same functions as those in the previous embodiments.

This wheel bearing apparatus has a structure of a so-called "third generation" for a driving wheel. It includes an inner member 49 with a wheel hub 48 and the inner ring 2. An outer member 50 is fit onto the inner member 49 via double row rolling elements 4, 4. The inner member 49 is connected to a constant velocity universal joint 13.

The inner member 49 includes the wheel hub 48 and the inner ring 2 secured on the wheel hub 48. The wheel hub 48 has the wheel mounting flange 6 on its outer side end. The wheel hub outer circumference has the outer side inner raceway surface 1a. The cylindrical portion 1b axially extends from the inner raceway surface 1a.

The wheel hub 48 is made of medium/high carbon steel such as S53C including carbon of 0.40-0.80% by weight. It is formed with a hardened layer with a surface hardness of 58-64 HRC. The hardened layer is formed by high frequency induction hardening in a region from an inner side base 6b of the wheel mounting flange 6 to the cylindrical portion 1b via the inner raceway surface 1a. A caulking portion 1d is not hardened and remains as is with its surface hardness after forging.

The outer member 50 is made of medium/high carbon steel including carbon of 0.40-0.80% by weight such as S53C. It is formed, on its outer circumference, with a body mounting flange 5b to be mounted on a knuckle (not shown). The outer member inner circumference includes double row outer raceway surfaces 5a, 5a that correspond to the double row inner raceway surfaces 1a, 2a of the inner member 49.

In this bearing apparatus, the end face of the smaller diameter side (outer side) of the inner ring 2 abuts against the shoulder of the wheel hub 48. Thus, it forms a double row angular contact ball bearing of a so-called back-to-back duplex type. Seals 8, 51 are mounted in annular spaces between the outer member 50 and the inner member 49. The seals 8, 51 prevent leakage of lubricating grease sealed within the bearing apparatus and entry of rainwater or dusts into the bearing apparatus.

A constant velocity universal joint 13 has an outer joint member 22, a joint inner ring 52, a cage 53, and torque transmitting balls 54. The outer joint member 22 has an integrally formed cup-shaped mouth portion 55, a shoulder 23 and a shaft portion 24. The shoulder 23 forms a bottom of the mouth portion 55. The shaft portion 24 axially extends from the shoulder 23.

In this embodiment, the sensor holder 56 is mounted on the inner side end of the outer member 50. The inner side seal 51 is mounted in an annular space formed between the sensor holder 56 and the inner ring 2. As shown in FIG. 24, the seal 51 includes annular sealing plate 57 and a slinger 58. Each component has a substantially L shaped cross-section and is arranged opposite to one another. The sealing plate 57 includes a metal core 59 molded with the sensor holder 56. The exposed portion of the sealing plate 57 is fit into the end of the outer member 50. A sealing member 60 is integrally joined to the metal core 59 via vulcanized adhesion. A pulser ring 61 is fit onto the slinger 58.

The metal core 59 is press-formed from austenitic stainless steel sheet (JIS SUS 304 etc.), ferritic stainless steel sheet (JIS SUS 430 etc.) or preserved cold rolled sheet (JIS SPCC etc.). The metal core 59 includes a cylindrical portion 59a that is integrally molded with the sensor holder 56. An inner circumferential portion 59b extends radially inward from the cylindrical portion 59a. A partially exposed portion of the cylindrical portion 59a is fit into the end of the outer member 50. This provides a strong anti-pulling out force of the sensor holder 56 and improves the sealability of the fitting portion. The metal core 59 is preferably formed from non-magnetic austenitic stainless steel sheet to prevent the detecting performance of the wheel speed sensor 64 from being affected by any adverse effect.

The sealing member 60 is formed from synthetic rubber such as NBR (acrylonitrile-butadien rubber). It is integrally joined to the inner circumferential portion 59b of the metal core 59 via vulcanized adhesion. The sealing member 60 has an integrally formed side lip 60a and a pair of radial lips 60b, 60c.

The slinger 58 is press-formed from austenitic stainless steel sheet (JIS SUS 304 etc.), ferritic stainless steel sheet (JIS SUS 430 etc.) or preserved cold rolled sheet (JIS SPCC etc.). The slinger 58 includes a cylindrical portion 58a press-fit onto the outer circumference of the inner ring 2. A standing portion 58b extends radially outward from the cylindrical portion 58a.

The pulser ring 61 includes a metal core 62 press-fit onto the slinger 58. A magnetic encoder 63 is integrally joined to the metal core 62, via vulcanized adhesion. The metal core 62 of the pulser ring 61 is press-formed, with a substantially C shaped cross-section, from a ferritic stainless steel sheet (JIS SUS 430 etc.) or preserved cold rolled sheet (JIS SPCC etc.). The metal core 62 includes a cylindrical inner circumference 62a press-fit onto the cylindrical portion 58a of the slinger 58. A standing portion 62b extends radially outward from the inner circumference 62a. An outer circumference 62c axially extends from the standing portion 62b. The magnetic encoder 63 is integrally joined to the outer circumference 62c via vulcanized adhesion. The side lip 60a of the sealing member 60 slidingly contacts the standing portion 62b of the metal core 62 of the pulser ring 61. The pair of radial lips 60b, 60c slidingly contacts the cylindrical portion 58a of the slinger 58.

The magnetic encoder 63 is a rubber magnet formed from an elastomer mingled with magnetic powder such as ferrite. It is constructed as a rotary encoder to detect wheel speed having N and S poles alternately arranged along its circumference. This obtains a stable detecting sensitivity in cooperation with the ferromagnetic metal core 62.

The seal 51 prevents the pulser ring 61 from being soiled by dusts etc. In addition, the magnetic encoder 63 is isolated from the rolling elements 4 and each raceway surface by the sealing plate side lip 60a in sliding contact with the pulser ring 61 and the radial lips 60b, 60c. Thus, it is possible to prevent abraded metallic powder etc. generated during rotation of the rolling elements 4 from being deposited and stuck onto the magnetic encoder 63.

The sensor holder 56 is injection molded from non-magnetic resin material such as polyphenylene sulfide (PPS) including fiber reinforcing material of GF. The wheel speed sensor 64 is embedded in the holding portion of the sensor holder 56. The speed sensor 64 opposes the magnetic encoder 63 via a predetermined radial gap (air gap). Thus, it is possible to improve corrosion resistance, strength and durability without providing any adverse influence to the detecting performance of the wheel speed sensor 64. The wheel speed sensor 64 includes a magnetic detecting element 64a such as a Hall effect element, magnetic resistance element (MR element) etc. to change its characteristics in accordance with the flow direction of magnetic flux. The IC 64c incorporated via a lead wire 64b with a wave forming circuit to rectify the output wave form of magnetic detecting element 64a is included. This detects the wheel speed with a high reliability and at a low cost. The sensor holder 56 may be formed by injectable synthetic resins such as polyamide (PA) 66 and polyethylene terephthalate etc. other than materials mentioned above. The embodiment of the wheel speed sensor 64 shown in FIG. 24 is merely one example where an IC and the magnetic detecting element 64a and the wave forming circuit are integrated and may be used.

As shown in FIG. 25, a taking out portion 65 is formed on the sensor holder 56 at a predetermined circumferential position (vertically uppermost position in FIG. 25) while projecting from the sensor holder 56. A harness 66 directly connected to the IC 64c of the wheel speed sensor 64 is integrally molded with the taking out portion 65. A male connector 67, to be connected to a harness (not shown) connected to an electronic circuit on a body of vehicle, is connected to the end of the harness 66. A clip 68, for securing the harness 66, is anchored on a side surface of the sensor holder 56 at a mounting angle θ within 90° from the taking out portion 65. This shortens the length of the harness 66 extending circumferentially along the sensor holder 56. Thus, this prevents the generation of vibration of the harness 66 during running of the vehicle. Accordingly, it is possible to provide a wheel bearing apparatus incorporating a wheel speed detecting apparatus that can improve the durability of the harness 66 and the reliability of the bearing apparatus due to stable speed detection. Also, it prevents pulling-out of the sensor holder 56 from the outer member 50 by the influence of vibration.

The clip 68 is press-formed, with a substantially C shaped configuration, from austenitic stainless steel sheet (JIS SUS 304 etc.) or preserved cold rolled sheet (JIS SPCC etc.). It is integrally secured on the sensor holder 56 during injection molding. The harness 66 can be easily secured and contacted on the side surface of the sensor holder 56 by bending both ends of the clip 68 as shown by arrows in FIG. 26. Thus, it is possible to surely prevent the generation of vibration of the harness 66 during running of the vehicle.

Although it is shown as one example that the taking out portion 65 is formed on the sensor holder 56 and projecting from it toward the inner side and the harness 66 is directly molded with the taking out portion 65 and that the connector 67 is connected to the end of the harness 66, it may be possible to adopt a structure where a connector is integrally molded with the sensor holder while tangentially projecting from it. The harness connected to the electronic circuit on a body of vehicle is connected to the connector and the harness is secured on the side surface of the sensor holder by a clip.

The mechanism for connecting the harness 66 on the sensor holder 56 is not limited to the clip 68. For example, the mechanism shown in FIG. 27 may be adopted. This sensor holder 69 is formed by injection molding with an integral anchoring portion 70 on its side. The anchoring portion 70 has a recess 70a with a circular arc cross-section. It has a slightly smaller diameter than an outer diameter of the harness 66. The harness 66 is snapped into the recess 70a. This makes it possible to mount the harness 66 in the recess 70a by a "one-touch" operation by elastically deforming the anchoring portion 70. Thus, this improves workability during assembly of the bearing apparatus.

Although it is shown in the illustrated embodiment as an active type wheel speed detecting apparatus including the magnetic encoder 63 and the wheel speed sensor 64 with magnetic detecting elements such as Hall effect elements, it is possible to use a passive type wheel speed detecting apparatus including gears, magnets, and annular coils, etc.

The wheel bearing apparatus incorporating a wheel speed detecting apparatus of the present disclosure can be applied to a wheel bearing apparatus of an inner ring rotation structure where any type of the wheel speed detecting apparatus is incorporated.

The present disclosure has been described with reference to the preferred embodiments. Obviously, modifications and alternations will occur to those of ordinary skill in the art upon reading and understanding the preceding detailed description. It is intended that the present disclosure be construed as including all such alternations and modifications insofar as they come within the scope of the appended claims or their equivalents.

What is claimed is:

1. A wheel bearing apparatus incorporating a wheel speed detecting apparatus comprising:

an outer member formed, on its outer circumference, with a body mounting flange to be mounted on a suspension apparatus of a vehicle, and the outer member inner circumference includes double row outer raceway surfaces;

an inner member includes a wheel hub and at least one inner ring, the wheel hub is integrally formed with a wheel mounting flange on one end, a cylindrical portion axially extends from the wheel mounting flange, the inner ring is press-fit onto the cylindrical portion of the wheel hub, and the wheel hub and the inner ring are each formed with one double row inner raceway surface on their outer circumferences that oppose the double row outer raceway surfaces;

double row rolling elements are rollably contained between the inner and outer raceway surfaces;

seals are mounted in annular openings formed between the outer member and the inner member;

a sensor holder includes an annular cover and a holding portion, said annular cover is press-fit onto the outer circumference of an inner side end portion of the outer member, and said holding portion is made of synthetic resin and joined to the cover, said holding portion including a wheel speed sensor;

a pulser ring arranged on the outer circumference of the inner ring, the pulser ring having alternately and equidistantly varying circumferential characteristics, the pulser ring is arranged opposite to the wheel speed sensor via a predetermined axial gap;

said cover comprises a cylindrical fitting portion adapted to be press-fit onto the inner side end portion of the outer member, a flange portion extends radially inward from the fitting portion, the flange portion is adapted to be in close contact with the end face of the outer member, and a bottom portion extends further radially inward from the flange portion to the inner ring and on an inner side of the inner ring, a securing portion is formed in the bottom portion, the securing portion projects from the bottom portion toward the inner side at a radially, outer portion of the bottom portion, said holding portion is integrally joined to the securing portion of the bottom portion and said holding portion arranged over a region beyond the outer circumference of the securing portion to the fitting portion, the flange portion is formed with a flat surface so that it forms an abutting width larger than 5 mm, against the end face of the outer member, or larger than 50% relative to the flat width of the end face of the outer member.

2. The wheel bearing apparatus incorporating a wheel speed detecting apparatus of claim 1, wherein an inner side seal of the seals comprises an annular sealing plate including a metal core press-formed from a steel plate with a substantially L shaped cross-section, said annular sealing plate adapted to be fit into the inner side end of the outer member, a sealing member integrally joined to the metal core, a slinger press-formed from a steel plate with a substantially L shaped cross-section, the slinger adapted to be fit onto the outer circumference of the inner ring, and a magnetic encoder is integrally joined to the inner side surface of the slinger, the magnetic encoder being made from elastomer mingled with magnetic powder and magnetized with N and S poles alternately arranged in a circumferential direction.

3. The wheel bearing apparatus incorporating a wheel speed detecting apparatus of claim 1, wherein a harness extends from the holding portion tangentially to the cover.

4. The wheel bearing apparatus incorporating a wheel speed detecting apparatus of claim 3, wherein the holding portion is arranged within a range of 30-90° from a vertical direction relative to the ground.

5. The wheel bearing apparatus incorporating a wheel speed detecting apparatus of claim 1, wherein a drain aperture is formed in the bottom portion of the cover at a position nearest to the ground.

6. The wheel bearing apparatus incorporating a wheel speed detecting apparatus of claim 1, wherein the cover is formed from non-magnetic austenitic stainless steel sheet.

7. The wheel bearing apparatus incorporating a wheel speed detecting apparatus of claim 1, wherein a slinger is formed from a ferromagnetic steel plate.

8. The wheel bearing apparatus incorporating a wheel speed detecting apparatus of claim 1, wherein the holding portion is formed from non-magnetic synthetic resin.

9. The wheel bearing apparatus incorporating a wheel speed detecting apparatus of claim 8, wherein the holding portion is formed from polyphenylene sulfide.

10. The wheel bearing apparatus incorporating a wheel speed detecting apparatus of claim 1, wherein the holding portion includes 10-45 wt % of a fiber reinforcing material comprising glass fiber.

11. The wheel bearing apparatus incorporating a wheel speed detecting apparatus of claim 1, wherein a mark is formed on a predetermined position of the inner side end of the outer member and another mark is formed on a predetermined position of the sensor holder, and wherein the sensor holder is mounted on the outer member with the marks aligned with each other.

12. The wheel bearing apparatus incorporating a wheel speed detecting apparatus of claim 11, wherein the mark of the outer member is formed by laser marking or painting.

13. The wheel bearing apparatus incorporating a wheel speed detecting apparatus of claim 11, wherein the mark on the sensor holder is formed by painting or indenting.

14. The wheel bearing apparatus incorporating a wheel speed detecting apparatus of claim 1, wherein a harness connected to the wheel speed sensor to send an output signal from the wheel speed sensor to a controller is taken from the holding portion of the sensor holder, and wherein the radial dimension of the holding portion is limited to a range of 8.5-15.0 mm and an axially projected amount of the holding portion from the end face of the outer member is limited to a range of 8.5-20.0 mm.

15. The wheel bearing apparatus incorporating a wheel speed detecting apparatus of claim 14 wherein the wheel speed sensor comprises a magnetic detecting element for changing its characteristics in accordance with the flow direction of magnetic flux, and an IC, the IC incorporated with a wave forming circuit to rectify the output wave form of magnetic detecting element.

16. The wheel bearing apparatus incorporating a wheel speed detecting apparatus of claim 1, wherein a slinger is positioned and secured so that the inner side surface of the encoder is positioned in a same plane as that of the end face of the inner ring or in a position slightly retracted therefrom toward the inner side of the bearing apparatus, and wherein the outer side surface of the holding portion is arranged so that it does not project from the inner surface of the bottom portion of the cover.

* * * * *

UNITED STATES PATENT AND TRADEMARK OFFICE
CERTIFICATE OF CORRECTION

Page 1 of 1

PATENT NO. : 8,052,329 B2
APPLICATION NO. : 12/640375
DATED : November 8, 2011
INVENTOR(S) : Yujiro Ono et al.

It is certified that error appears in the above-identified patent and that said Letters Patent is hereby corrected as shown below:

Column 12
Line 15, "a" should be --$\alpha$--

Column 15
Line 66, "selling" should be --setting--

Signed and Sealed this
First Day of May, 2012

David J. Kappos
*Director of the United States Patent and Trademark Office*